United States Patent
Seong et al.

(10) Patent No.: US 11,641,292 B2
(45) Date of Patent: May 2, 2023

(54) DECISION FEEDBACK EQUALIZER AND A DEVICE INCLUDING THE SAME

(71) Applicant: SAMSUNG ELECTRONICS CO., LTD., Suwon-si (KR)

(72) Inventors: Kihwan Seong, Hwaseong-si (KR); Hyoungjoong Kim, Hwaseong-si (KR); Woongki Min, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/392,742

(22) Filed: Aug. 3, 2021

(65) Prior Publication Data
US 2022/0141054 A1 May 5, 2022

(30) Foreign Application Priority Data
Nov. 5, 2020 (KR) .......................... 10-2020-0147152

(51) Int. Cl.
*H04B 3/04* (2006.01)
*H04L 25/03* (2006.01)

(52) U.S. Cl.
CPC .. *H04L 25/03019* (2013.01); *H04L 25/03267* (2013.01); *H04B 3/04* (2013.01)

(58) Field of Classification Search
CPC . H04W 52/20; H04W 52/225; H04W 52/029; H04W 52/343; H04W 24/00; H04W 84/18; H04W 12/06; H04W 74/06; H04L 25/03057; H04L 2025/0349; H04L 25/03343; H04L 25/03885; H04L 25/03146; H04L 25/03267; H04L 1/0054; G06F 11/322; G06F 13/4291; G06F 1/3287; G06F 13/385; G06F 13/4059; G06F 13/4068; G06F 13/4072; G06F 13/42
USPC ........................................................ 375/232
See application file for complete search history.

(56) References Cited

U.S. PATENT DOCUMENTS

| | | | |
|---|---|---|---|
| 7,110,449 B2 | 9/2006 | Heo et al. | |
| 7,668,238 B1 | 2/2010 | Rokhsaz | |
| 7,822,114 B2 | 10/2010 | Bulzacchelli et al. | |
| 8,085,841 B2 | 12/2011 | Bulzacchelli et al. | |
| 8,391,347 B2 | 3/2013 | Kim et al. | |
| 9,148,316 B2 | 9/2015 | Mukherjee | |
| 9,419,827 B2 | 8/2016 | Thakkar et al. | |

(Continued)

FOREIGN PATENT DOCUMENTS

KR 10-0916377 9/2009

*Primary Examiner* — Eva Y Puente
(74) *Attorney, Agent, or Firm* — F. Chau & Associates, LLC

(57) ABSTRACT

A decision feedback equalizer including: a first input latch configured to generate a first output signal from first data received by the first input latch, wherein the first input latch includes: a first sub-circuit configured to receive the first data and a reference voltage, compare the first data and the reference voltage, and generate first internal signals having different transition timings according to a result of the comparison between the first data and the reference voltage; and a second sub-circuit configured to receive, as first feedback, a second output signal, which corresponds to second data received by the first latch earlier than the first data, and generate the first output signal, which compensates for a difference between the transition timings of the first internal signals, based on the first feedback.

17 Claims, 21 Drawing Sheets

(56) References Cited

U.S. PATENT DOCUMENTS

| | | | |
|---|---|---|---|
| 9,577,848 B1 | 2/2017 | Chattopadhyay et al. | |
| 9,660,843 B2 | 5/2017 | Mukherjee | |
| 9,973,357 B2 | 5/2018 | Sakai | |
| 10,091,031 B1 * | 10/2018 | Dimitriu | H04L 25/03146 |
| 10,103,911 B2 | 10/2018 | Shibasaki | |
| 11,323,296 B1 * | 5/2022 | Gugwad | H04L 27/01 |
| 2005/0041979 A1 * | 2/2005 | Gu | H04B 10/2507 |
| | | | 398/155 |
| 2016/0191276 A1 * | 6/2016 | Sakai | H04L 25/03057 |
| | | | 375/233 |

* cited by examiner

DECISION FEEDBACK EQUALIZER AND A DEVICE INCLUDING THE SAME

CROSS-REFERENCE TO RELATED APPLICATION

This application claims priority under 35 U.S.C. § 119 to Korean Patent Application No. 10-2020-0147152, filed on Nov. 5, 2020, in the Korean Intellectual Property Office, the disclosure of which is incorporated by reference herein in its entirety.

TECHNICAL FIELD

The inventive concept relates to a decision feedback equalizer, and more particularly, to a decision feedback equalizer for equalizing a data signal received with low power, and a device including the decision feedback equalizer.

DISCUSSION OF RELATED ART

Because vast data signals are transmitted and received between devices due to the rapid development of data technology, interfacing techniques for the facilitation of this data exchange are employed. Devices may be coupled to each other via channels for transferring data signals. However, data signals transferred via channels may include noise such as intersymbol interference (ISI) and the like due to various factors such as skin effect, dielectric loss, and the like. As a consequence, the quality of data signals transferred at high speeds may be deteriorated.

To increase the quality of data signals transferred between devices, the devices may include decision feedback equalizers that discriminate current data by using previous data as feedback. However, decision feedback equalizers consume relatively high power or have long feedback loop times. Accordingly, decision feedback equalizers may not smoothly perform equalization operations.

SUMMARY

According to an embodiment of the inventive concept, there is provided a decision feedback equalizer including: a first input latch configured to generate a first output signal from first data received by the first input latch, wherein the first input latch includes: a first sub-circuit configured to receive the first data and a reference voltage, compare the first data and the reference voltage, and generate first internal signals having different transition timings according to a result of the comparison between the first data and the reference voltage; and a second sub-circuit configured to receive, as first feedback, a second output signal, which corresponds to second data received by the first latch earlier than the first data, and generate the first output signal, which compensates for a difference between the transition timings of the first internal signals, based on the first feedback.

According to an embodiment of the inventive concept, there is provided a device including: a reception pad configured to receive a data signal including first data and second data, which are sequentially transferred via a channel; and a decision feedback equalizer configured to equalize the received data signal, wherein the decision feedback equalizer includes: a first input latch coupled to the reception pad and configured to generate a first output signal from the first data; and a second input latch coupled to the reception pad and configured to generate a second output signal from the second data, and wherein the second input latch includes: a first sub-circuit configured to generate internal signals having different transition timings according to a result of a comparison between the second data and a reference voltage; and a second sub-circuit configured to receive the first output signal as feedback and generate the second output signal by compensating for a difference between the transition timings of the internal signals based on the feedback.

According to an embodiment of the inventive concept, there is provided a decision feedback equalizer including: an input latch circuit configured to output first and second output signals, which are return-to-zero signals, by respectively comparing odd data and even data with a reference voltage; a middle latch circuit configured to receive the first and second output signals, convert the first and second output signals into non-return-to-zero signals, and output the converted first and second output signals; and an output latch circuit configured to receive the converted first and second output signals and output the converted first and second output signals in synchronization with a clock signal, wherein the input latch circuit includes: a first input latch including a first sub-circuit and a second sub-circuit, the first sub-circuit configured to generate first internal signals by comparing the odd data with the reference voltage, and the second sub-circuit configured to generate the first output signal based on the first internal signals and the second output signal; and a second input latch including a third sub-circuit and a fourth sub-circuit, the third sub-circuit configured to generate second internal signals by comparing the even data with the reference voltage, and the fourth sub-circuit configured to generate the second output signal based on the second internal signals and the first output signal.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
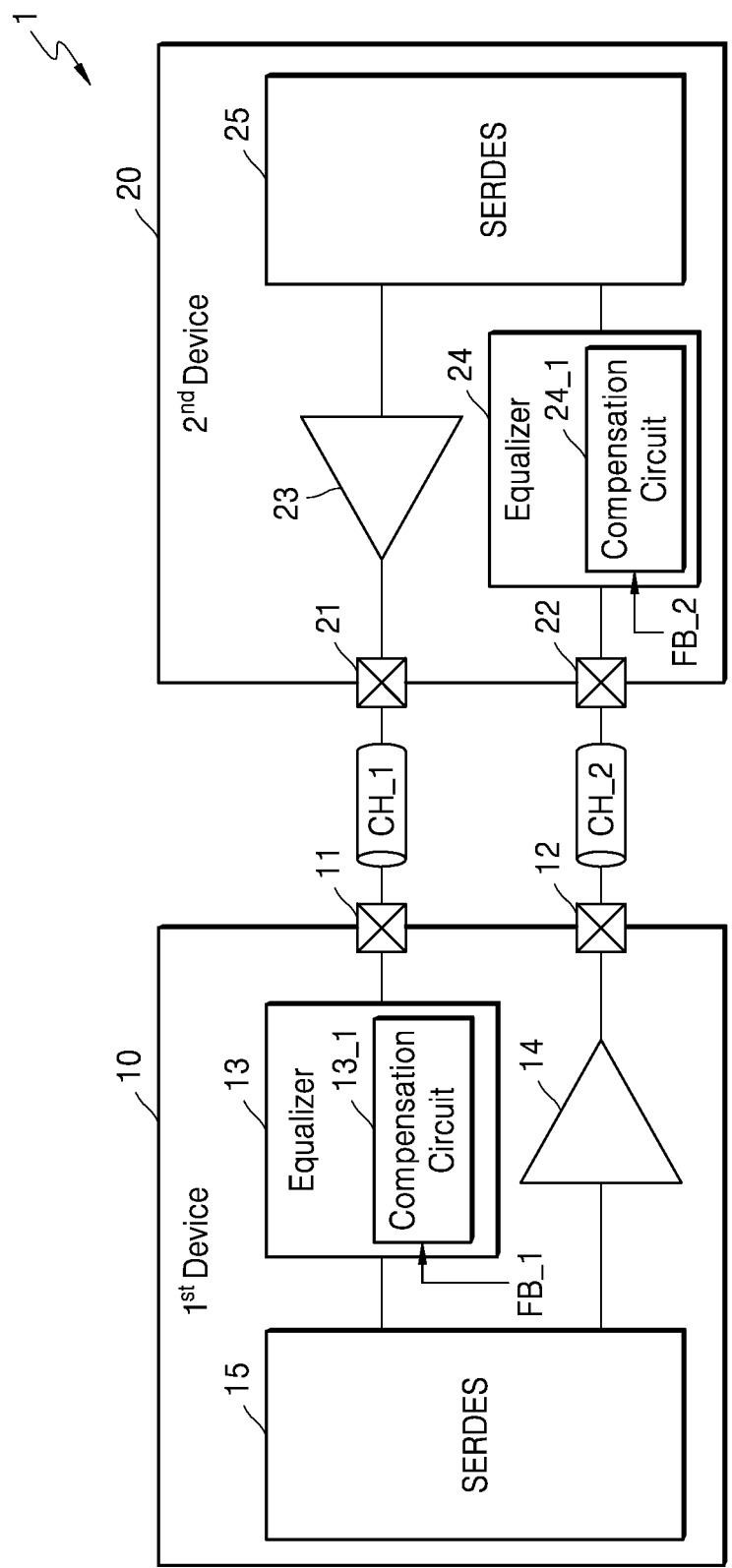
FIG. 1 is a block diagram illustrating an electronic system according to an embodiment of the inventive concept.

Hereinafter, embodiments of the inventive concept will be described in detail with reference to the accompanying drawings. In the drawings, like reference numerals may refer to like elements.

FIG. 1 is a block diagram illustrating an electronic system according to an embodiment of the inventive concept.

An electronic system 1 may include first and second devices 10 and 20. The first and second devices 10 and 20 may be referred to as electronic devices and may each be implemented by one of various devices such as a desktop computer, a laptop computer, a tablet computer, a smartphone, a wearable device, a video game console, a household appliance, a medical device, and the like.

However, the inventive concept is not limited thereto, and in some embodiments, the electronic system 1 may be implemented by a single electronic device. In such embodiments, each of the first and second devices 10 and 20 may be a component or intellectual property (IP) included in the single electronic device and may be implemented by a circuit, module, chip, and/or package-level entity. In some embodiments, the first and second devices 10 and 20 may also be implemented by one circuit, module, chip, and/or package-level entity. The terms "system" and "device" are provided to allow better understanding, and it is to be understood that the inventive concept is not limited by these terms.

The first and second devices 10 and 20 may communicate with each other and thus exchange data signals with each other via first and second channels CH_1 and CH_2. Each of the first and second channels CH_1 and CH_2 may include a conductive material to transmit data signals. For example, each of the first and second channels CH_1 and CH_2 may be implemented by a trace pattern on a printed circuit board (PCB), a conducting wire of a cable, a metal pin/pad of a connector, or the like.

The first device 10 may include a reception pad 11, a transmission pad 12, an equalizer 13, a transmitter 14, and a serializer/deserializer (SERDES) 15. The second device 20 may include a transmission pad 21, a reception pad 22, a transmitter 23, an equalizer 24, and a SERIES 25. Although minimum components of the first and second devices 10 and 20 are illustrated in FIG. 1 to describe the inventive concept, the inventive concept is not limited thereto. For example, each of the first and second devices 10 and 20 may further include functional circuits (for example, a controller, a processor, a memory, an image sensor, a display, and the like), a clock and data recovery (CDR) circuit, a receiver, and the like.

The first and second devices 10 and 20 may be implemented by separate components, IPs, or electronic devices. In some embodiments, the first and second devices 10 and 20 may mutually recognize that the first device 10 is an external device to the second device 20 and the second device 20 is an external device to the first device 10.

Hereinafter, transmission of a data signal from the first device 10 to the second device 20 will be described. The SERDES 15 may serialize a data signal generated according to operations of functional circuits in the first device 10. The SERDES 15 may provide the serialized data signal to the transmitter 14, and the transmitter 14 may transmit the data signal to the second device 20 via the second channel CH_2. For example, the transmitter 14 may transmit the data signal to the second channel CH_2 via the transmission pad 12. The equalizer 24 may be coupled to the reception pad 22 and may receive the data signal via the reception pad 22. The equalizer 24 may perform an equalization operation on the data signal according to embodiments of the inventive concept and may transfer the equalized data signal to the SERDES 25. The SERDES 25 may deserialize the equalized data signal and may provide the deserialized data signal to functional circuits in the second device 20.

Hereinafter, transmission of a data signal from the second device 20 to the first device 10 will be described.

The SERDES 25 may serialize a data signal generated according to operations of the functional circuits in the second device 20. The SERDES 25 may provide the serialized data signal to the transmitter 23, and the transmitter 23 may transmit the data signal to the first device 10 via the first channel CH_1. For example, the transmitter 23 may transmit the data signal to the first channel CH_1 via the transmission pad 21. The equalizer 13 may be coupled to the reception pad 11 and may receive the data signal via the reception pad 11. The equalizer 13 may perform an equalization operation on the data signal according to embodiments of the inventive concept and may transfer the equalized data signal to the SERDES 15. The SERDES 15 may deserialize the equalized data signal and may provide the deserialized data signal to the functional circuits in the first device 10.

In communication between the first and second devices 10 and 20, due to various factors such as a skin effect of the first and second channels CH_1 and CH_2, dielectric loss, and the like, each of the first and second channels CH_1 and CH_2 may exhibit low-pass frequency response characteristics. Accordingly, in a high-speed operation, bandwidths of the first and second channels CH_1 and CH_2 may be limited and may be less than bandwidths of data signals. This may weaken high-frequency components of the data signals transferred via the first and second channels CH_1 and CH_2 and may cause intersymbol interference in the time domain. To alleviate such intersymbol interference, the equalizers 13 and 24 may perform an equalization operation on the received data signals according to embodiments of the inventive concept.

The equalizers 13 and 24 according to an embodiment of the inventive concept may each be implemented by a decision feedback equalizer. The equalizers 13 and 24 may respectively include compensation circuits 13_1 and 24_1. The compensation circuits 13_1 and 24_1 may respectively receive first feedback FB_1 and second feedback FB_2 and may respectively perform compensation operations based on the first feedback FB_1 and the second feedback FB_2 to alleviate the intersymbol interference.

Hereinafter, the equalizer 13 of the first device 10 will be mainly described, and descriptions thereof may also be applied to the equalizer 24 of the second device 20. In an embodiment of the inventive concept, the equalizer 13 may receive a value of previous data as the first feedback FB_1 and may discriminate a value of current data by using the first feedback FB_1. The first feedback FB_1 is a signal generated inside the equalizer 13, and a timing margin for providing the first feedback FB_1 to the compensation circuit 13_1 may be implemented to be sufficiently secured. For example, the equalizer 13 may be implemented such that the timing margin for providing the first feedback FB_1 to the first compensation circuit 13_1 is secured to be "1 unit interval (UI)+α,". This will be described below in detail. The equalizer 13 may include a plurality of latch circuits without including a separate adder such that the equalizer 13 is able to perform a low power-based equalization operation. A latch circuit may be a circuit including at least one latch. For example, the equalizer 13 may be implemented by a k-stage latch structure (where k is an integer of 2 or more). For example, the equalizer 13 may include: an input latch circuit configured to latch a value of data by discriminating the value of the data included in a received data signal; a middle latch circuit configured to receive an output signal including the latched value of the data from the input latch circuit; and an output latch circuit configured to output the output signal, which is received from the middle latch circuit, in synchronization with a certain clock signal. However, because this is merely an example, the inventive concept is not limited thereto, and the equalizer 13 may be implemented by various latch structures.

Because there is not much difference between data and a reference voltage due to the intersymbol interference, a value of the data may not be accurately discriminated. To address this, the compensation circuit 13_1 may compensate for a difference between data and a reference voltage based on the first feedback FB_1, thereby enabling the equalizer 13 to accurately and quickly discriminate a value of the data. In an embodiment of the inventive concept, the compensation circuit 13_1 may compensate for a fine difference between data and the reference voltage due to the intersymbol interference by selectively adjusting the driving strength of a current path flowing to a ground node, based on the first feedback FB_1. This will be described below in detail.

The equalizers 13 and 14 according to an embodiment of the inventive concept may be operated with low power and may perform a facilitated and improved equalization operation by maximally securing the timing margin for respectively providing the first feedback FB_1 and the second feedback FB_2 to the compensation circuits 13_1 and 24_1.

Figure 2:
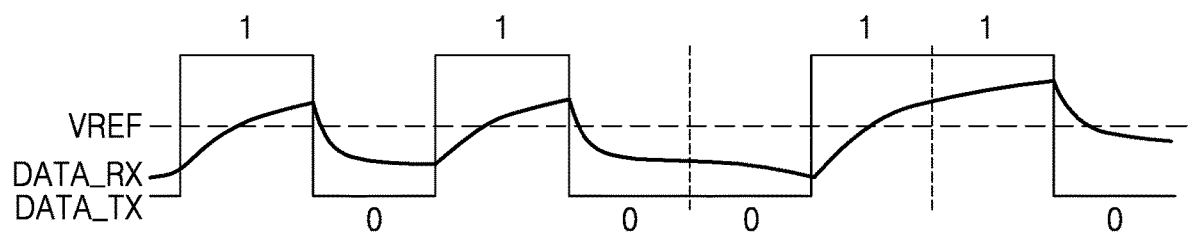
FIG. 2 is a diagram illustrating example distortions of a data signal received via a first channel of FIG. 1.

FIG. 2 is a diagram illustrating example distortions of a data signal received via the first channel of FIG. 1. It is assumed that a data signal includes a plurality of pieces of data having a value of "0" or "1". Because this is an assumption for aiding understanding of embodiments of the inventive concept, the inventive concept is not limited thereto. For example, the inventive concept may also be applied to pulse amplitude modulation-based data signals.

Referring to FIGS. 1 and 2, a waveform of a transmission data signal DATA_TX, which is output from the transmission pad 21 of the second device 20, may be close to a pulse shape. For example, a digital pulse shape. The transmission data signal DATA_TX passes through the first channel CH_1 and is received as a reception data signal DATA_RX by the equalizer 13 via the reception pad 11 of the first device 10, and the reception data signal DATA_RX may be distorted due to intersymbol interference or the like and thus have a different waveform from the transmission data signal DATA_TX. Accordingly, the reception data signal DATA_RX may not be suitable to permit a conventional equalizer to quickly and accurately discriminate a value of data thereof by comparing the reception data signal DATA_RX with a reference voltage VREF. However, the equalizers 13 and 24 according to an embodiment of the inventive concept may, perform an equalization operation on the reception data signal DATA_RX and thus quickly and accurately discriminate the value of the data.

FIGS. 3A to 5 are block diagrams each illustrating an equalizer according to an embodiment of the inventive concept. It is to be understood that equalizers described below are merely examples, and thus, the inventive concept is not limited thereto.

Figure 3A:
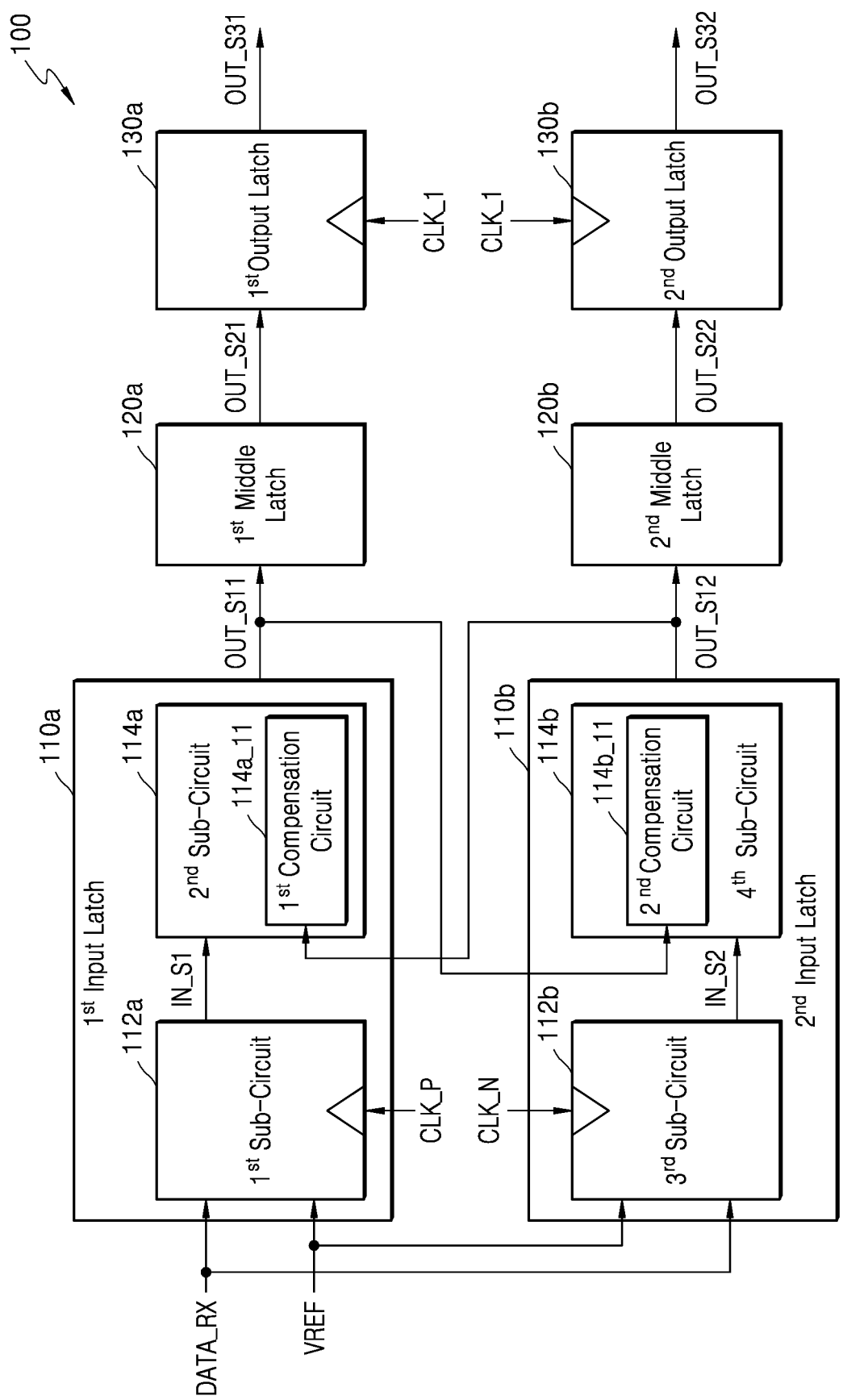
FIGS. 3A, 3B, 4 and 5 are block diagrams each illustrating an equalizer according to an embodiment of the inventive concept.

Referring to FIG. 3A, an equalizer 100 may include first and second input latches 110a and 110b, first and second middle latches 120a and 120b, and first and second output latches 130a and 130b. The first and second input latches 110a and 110b may be collectively referred to as an input latch circuit (or a first latch circuit), the first and second middle latches 120a and 120b may be collectively referred to as a middle latch circuit (or a second latch circuit), and the first and second output latches 130a and 130b may be collectively referred to as an output latch circuit (or a third latch circuit).

The first and second input latches 110a and 110b may alternately perform a latch operation on a data signal DATA_RX. The first input latch 110a may discriminate a value of odd data of the data signal DATA_RX and output the value of the odd data as a first output signal OUT_S11, and the second input latch 110b may discriminate a value of even data of the data signal DATA_RX and output the value of the even data as a second output signal OUT_S12. The first input latch 110a may include first and second sub-circuits 112a and 114a, and the second input latch 110b may include third and fourth sub-circuits 112b and 114b.

The first sub-circuit 112a may receive first data and the reference voltage VREF, may compare the first data with the reference voltage VREF in synchronization with a positive clock signal CLK_P, and may generate first internal signals IN_S1 having different transition timings according to a result of the comparison. The first data may be the odd data of the data signal DATA_RX. The first sub-circuit 112a may provide the first internal signals IN_S1 to the second sub-circuit 114a. The second sub-circuit 114a may include a first compensation circuit 114a_11.

The first compensation circuit 114a_11 may receive, as feedback, the second output signal OUT_S12 corresponding to second data that is received from the second input latch 110b earlier than the first data. The first compensation circuit 114a_11 may compensate for a difference between the transition timings of the first internal signals IN_S1, based on the second output signal OUT_S12. Here, the difference between the transition timings of the first internal signals IN_S1 may have been reduced due to intersymbol interference or the like. In an embodiment of the inventive concept, the first compensation circuit 114a_11 may be coupled to a ground node and may compensate for the difference between the transition timings of the first internal signals IN_S1 by selectively adjusting the driving strength of a current path to the ground node from a node configured to output the first output signal OUT_S11. The second sub-circuit 114a may generate the first output signal OUT_S11 that includes the first data discriminated based on the first internal signals IN_S1.

The first middle latch 120a may receive the first output signal OUT_S11 and may convert the first output signal OUT_S11 into a certain signal. For example, when the first output signal OUT_S11 is a return-to-zero signal, the first middle latch 120a may convert the first output signal OUT_S11 into a non-return-to-zero signal. The first middle latch 120a may provide a converted first output signal OUT_S21 to the first output latch 130a. The first output latch 130a may output a first output signal OUT_S31 synchronized with a first clock signal CLK_1.

The third sub-circuit 112b may receive the second data and the reference voltage VREF, may compare the second data with the reference voltage VREF in synchronization with a negative clock signal CLK_N, and may generate second internal signals IN_S2 having different transition timings according to a result of the comparison. The second data may be the even data of the data signal DATA_RX. The third sub-circuit 112b may provide the second internal signals IN_S2 to the fourth sub-circuit 114b. The fourth sub-circuit 114b may include a second compensation circuit 114b_11.

The second compensation circuit 114b_11 may receive, as feedback, the first output signal OUT_S11 corresponding to third data that is received from the first input latch 110a earlier than the second data. The second compensation circuit 114b_11 may compensate for a difference between the transition timings of the second internal signals IN_S2, based on the first output signal OUT_S11. Here, the difference between the transition timings of the second internal signals IN_S2 may have been reduced due to intersymbol interference or the like. In an embodiment of the inventive concept, the second compensation circuit 114b_11 may be coupled to the ground node and may compensate for the difference between the transition timings of the second internal signals IN_S2 by selectively adjusting the driving strength of a current path to the ground node from a node configured to output the second output signal OUT_S12. The fourth sub-circuit 114b may generate the second output signal OUT_S12 that includes the second data discriminated based on the second internal signals IN_S2.

The second middle latch 120b may receive the second output signal OUT_S12 and may convert the second output signal OUT_S12 into a certain signal. For example, when the second output signal OUT_S12 is a return-to-zero signal, the second middle latch 120b may convert the second output signal OUT_S12 into a non-return-to-zero signal. The second middle latch 120b may provide a converted second output signal OUT_S22 to the second output latch 130b. The second output latch 130b may output a second output signal OUT_S32 synchronized with the first clock signal CLK_1. The first clock signal CLK_1 may be the positive clock signal CLK_P or the negative clock signal CLK_N. In some embodiments of the inventive concept, the first clock signal CLK_1 may be a clock signal having a different phase from the positive clock signal CLK_P and the negative clock signal CLK_N. The negative clock signal. CLK_N may be an inverted clock signal of the positive clock signal CLK_P.

In an embodiment of the inventive concept, the first and second middle latches 120a and 120b may be implemented by latches capable of outputting a non-return-to-zero signal that results from an input signal, for example, the first and second middle latches 120a and 120b may be implemented by set-reset (S-R) latches.

In an embodiment of the inventive concept, the equalizer 100 may perform a half-rate type equalization operation, to which an embodiment of the inventive concept is applied based on the positive and negative clock signals CLK_P and CLK_N. However, because this is merely an example, the inventive concept is not limited thereto, and the equalizer 100 may perform an equalization operation, to which an embodiment of the inventive concept is applied based on four or more clock signals having different phases.

Each of the first and second input latches 110a and 110b according to an embodiment of the inventive concept may secure a sufficient timing margin for providing feedback, by receiving the feedback via an internal node (for example, a node coupled to the first and second compensation circuits 114a_11 and 114b_11) rather than via an input node. Accordingly, because the first and second input latches 110a and 110b may be free from limits regarding a reception timing of feedback.

Figure 3B:
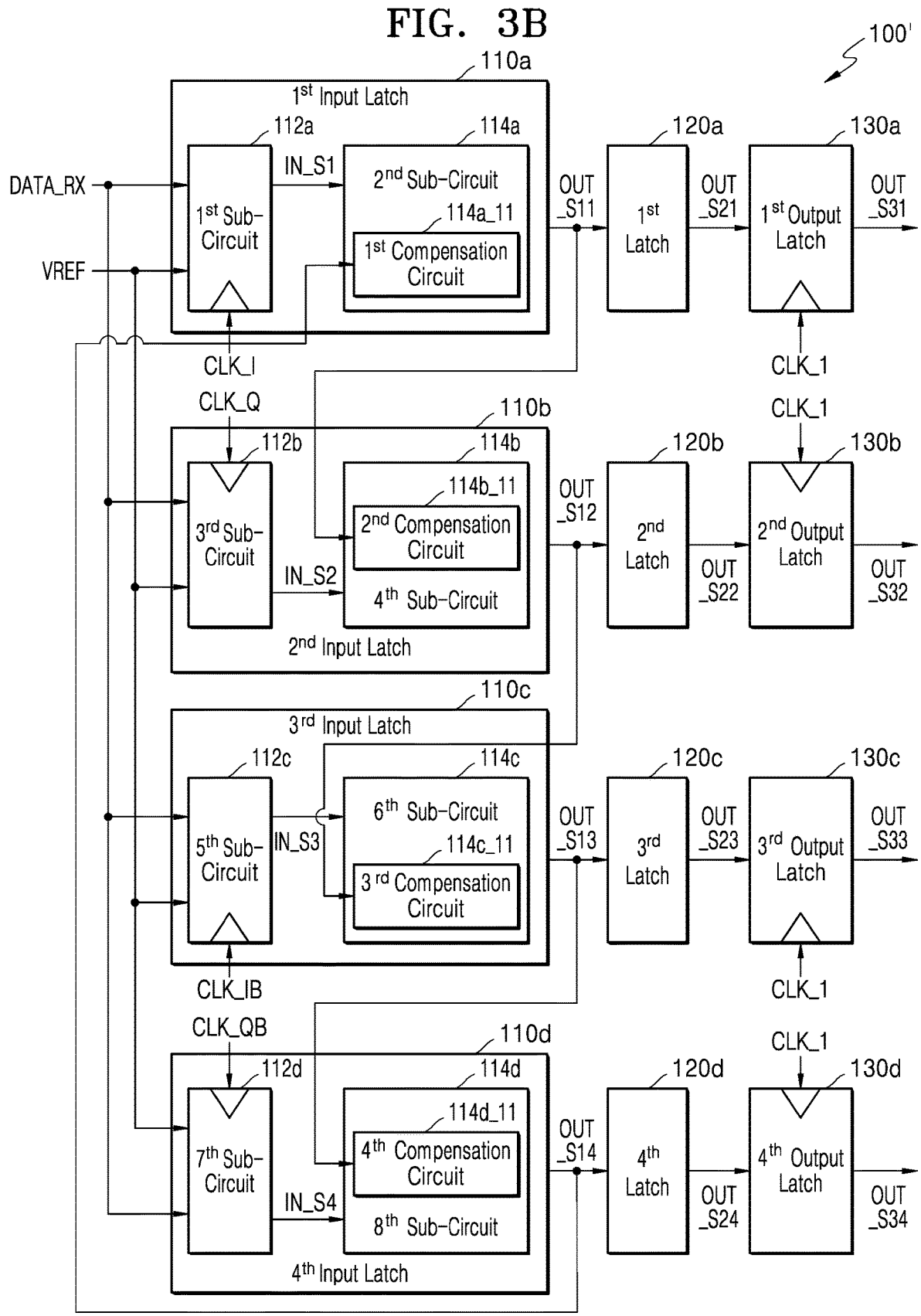

Referring further to FIG. 3B, as compared with the equalizer 100 of FIG. 3A, an equalizer 100' may further include third and fourth input latches 110c and 110d, third and fourth middle latches 120c and 120d, and third and fourth output latches 130c and 130d. The third input latch 110c may include fifth and sixth sub-circuits 112e and 114c, and the fourth input latch 110d may include seventh and eighth sub-circuits 112d and 114d. The sixth sub-circuit 114c may include a third compensation circuit 114c_11, and the eighth sub-circuit 114d may include a fourth compensation circuit 114d_11. The first sub-circuit 112a may receive an imaginary (I)-clock signal CLK_I, the third sub-circuit 112b may receive a quadrature (Q)-clock signal CLK_Q, the fifth sub-circuit 112c may receive an inverted I-clock signal CLK_IB, and the seventh sub-circuit 112d may receive an inverted Q-clock signal CLK_QB. The I-clock signal CLK_I and the Q-clock signal CLK_Q may have phase differences of 90 degrees from each other, the I-clock signal CLK_I and the inverted I-clock signal CLK_IB may have phase differences of 180 degrees from each other, and the Q-clock signal CLK_Q and the inverted Q-clock signal CLK_QB may have phase differences of 180 degrees from each other. The equalizer 100' may perform a quarter-rate type equalization operation, to which an embodiment of the inventive concept is applied based on the I- and inverted i-clock signals CLK_I and CLK_IB and the Q- and inverted Q-clock signals CLK_Q and CLK_QB. The third and fourth input latches 110c and 110d, the third and fourth middle latches 120c and 120d, and the third and fourth output latches 130c and 130d may output signals OUT_S13, OUT_S23 and OUT_S33 and OUT_S14, OUT_S24 OUTS_34 according to embodiments of the inventive concept. For example, the third and fourth input latches 110c and 110d, the third and fourth middle latches 120c and 120d, and the third and fourth output latches 130c and 130d may output the signals OUT_S13, OUT_S23 and OUT_S33 and OUT_S14, OUT_S24 OUT_S34 identical or similar to how the signals OUT_S1 to OUT_S31 and OUT_S12 to OUT_S32 are output as described above with reference to FIG. 3A. The first to fourth output latches 130a to 130d may be operated in synchronization with the first clock signal CLK_1. The first clock signal CLK_1 may be one of the I- and inverted I-clock signals CLK_I and CLK_IB and the Q- and inverted Q-clock signals CLK_Q and CLK_QB. In some embodiments of the inventive concept, the first clock signal CLK_1 may be a clock signal having a different phase from the I- and inverted I-clock signals CLK_I and CLK_IB and the Q- and inverted Q-clock signals CLK_Q and CLK_QB.

The first output signal OUT_S11 may be input to the second compensation circuit 114b_11, the second output signal OUT_S12 may be input to the third compensation circuit 114c_11, the third output signal OUT_S13 may be input to the fourth compensation circuit 114d_11, and the fourth output signal OUT_S14 may be input to the first compensation circuit 114a_11. Because operations of the third and fourth input latches 110c and 110d, the third and fourth middle latches 120c and 120d and the third and fourth output latches 130c and 130d are identical or similar to the operations of the first and second input latches 110a and 110b, the first and second middle latches 120a and 120b, and the first and second output latches 130a and 130b, which are described with reference to FIG. 3A, descriptions thereof are omitted.

Figure 4:
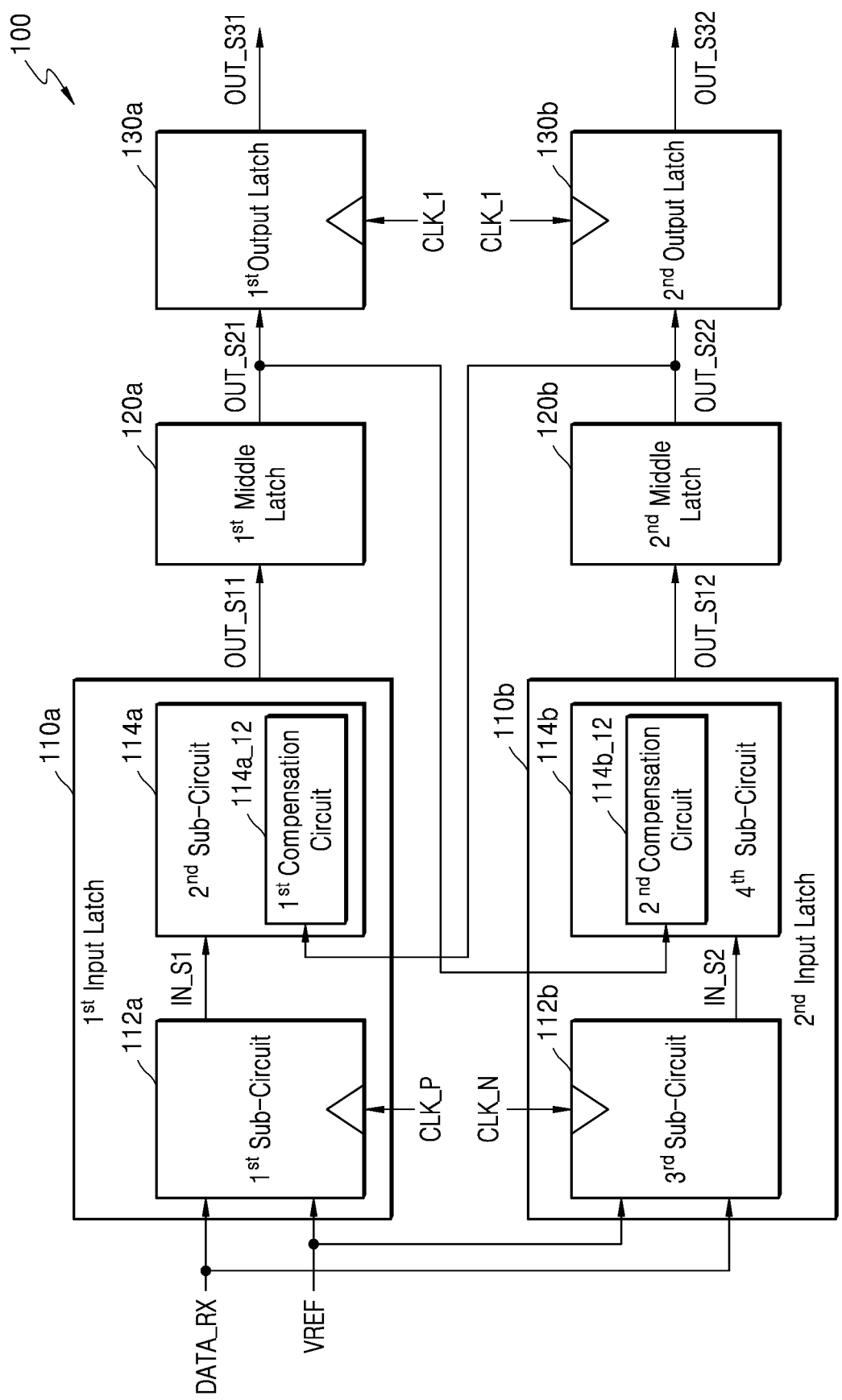

Referring further to FIG. 4, as compared with FIG. 3A, a first compensation circuit 114a_12 may receive, as feedback, the second output signal OUT_S22 generated by the second middle latch 120b, and a second compensation circuit 114b_12 may receive, as feedback, the first output signal OUT_S21 generated by the first middle latch 120a.

Figure 5:
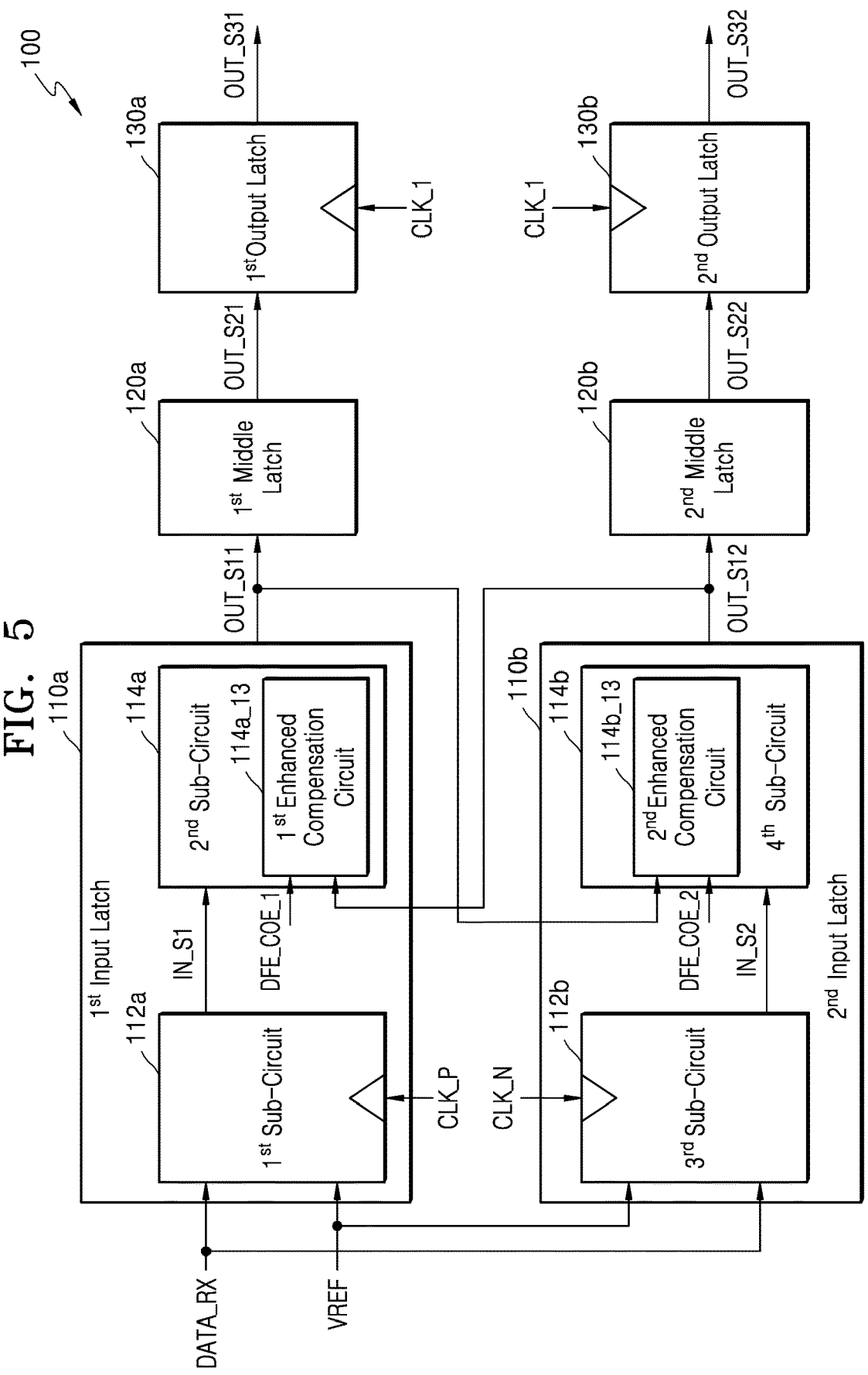

Referring further to FIG. 5, as compared with FIG. 3A, the second sub-circuit 114a may include a first enhanced compensation circuit 114a_13, and the fourth sub-circuit 114b may include a second enhanced compensation circuit 114b_13.

The first enhanced compensation circuit 114a_13 may receive a first coefficient signal DFE_COE_1 from the outside and may control a degree of adjustment of driving strength of a first current path to the ground node from a node configured to output the first output signal OUT_S11, based on the first coefficient signal DFE_COE_1. For example, the degree of adjustment of the driving strength of the first current path may be controlled depending on a degree of intersymbol interference caused by factors such as a state (for example, skin effect or dielectric loss) of a channel via which the data signal DATA_RX is transferred. For example, when the degree of intersymbol interference is relatively large, the first enhanced compensation circuit 114a_13 may control the degree of adjustment of the driving strength of the first current path to be increased, in response to the first coefficient signal DFE_COE_1. In addition, when the degree of intersymbol interference is relatively small, the first enhanced compensation circuit 114a_13 may control the degree of adjustment of the driving strength of the first current path to be decreased, in response to the first coefficient signal DFE_COE_1.

The second enhanced compensation circuit 114b_13 may receive a second coefficient signal DFE_COE_2 from the outside and may control a degree of adjustment of driving strength of a second current path to the ground node from a node configured to output the second output signal OUT_S12, based on the second coefficient signal DFE_COE_2. Because a method of controlling the degree of adjustment of the driving strength of the second current path is the same as the method of controlling the degree of adjustment of the driving strength of the first current path, descriptions thereof are omitted.

In an embodiment of the inventive concept, the first coefficient signal DFE_COE_1 may be the same as or different from the second coefficient signal DFE_COE_2. In addition, according to implementation examples of the first and second enhanced compensation circuits 114a_13 and 114b_13, the first and second coefficient signals DFE_COE_1 and DFE_COE_2 may be implemented by digital signals including a plurality of bits or by analog signals. The first and second coefficient signals DFE_COE_1 and DFE_COE_2 may be determined as results of certain training operations, and this will be described below in detail.

The first and second enhanced compensation circuits 114a_13 and 114b_13 according to an embodiment of the inventive concept may improve equalization performance of the equalizer 100 by performing compensation operations adaptively to a state of a channel or the like.

Figure 6:
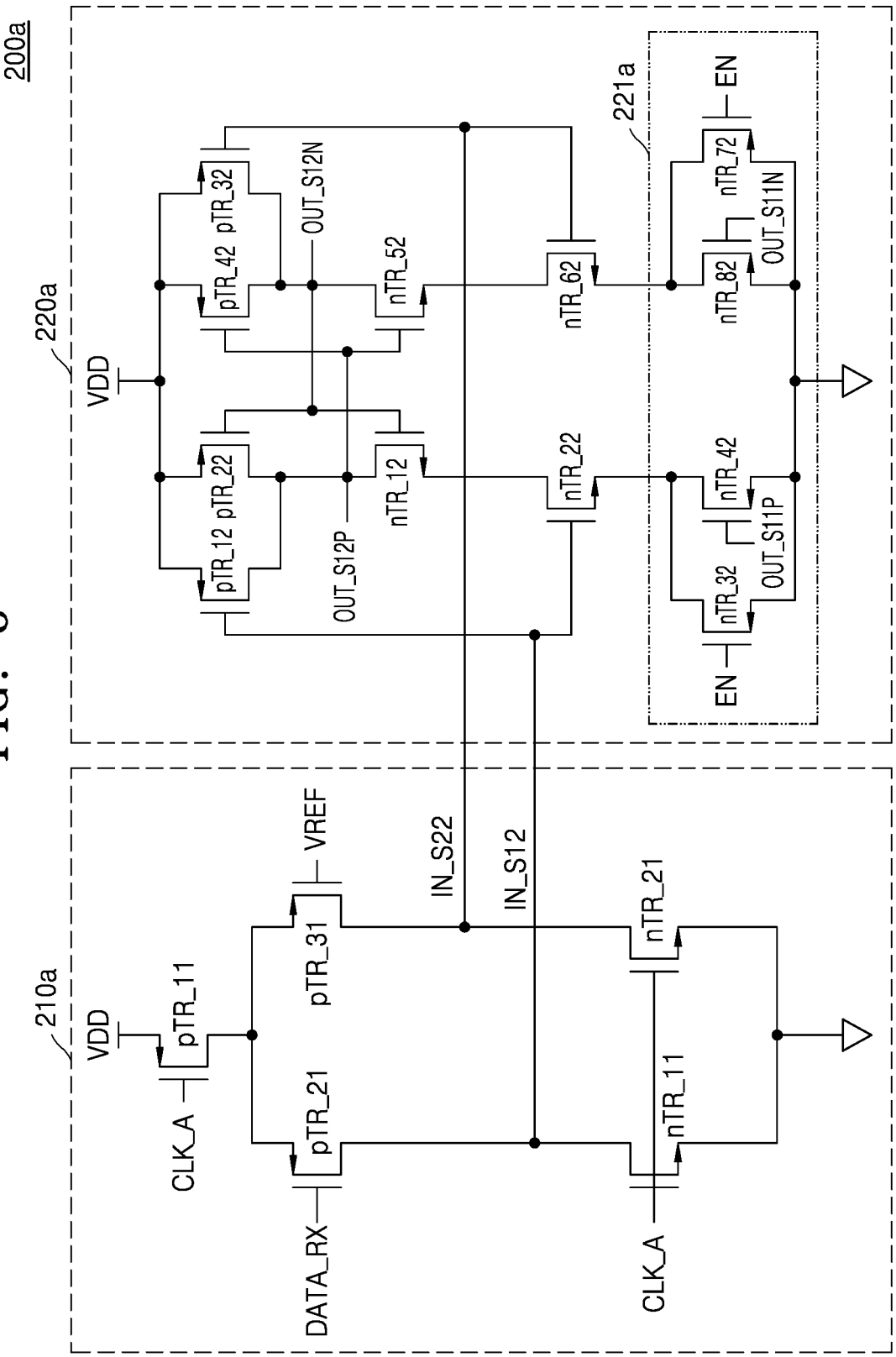
FIG. 6 is a circuit diagram illustrating a second input latch of FIG. 3.

FIG. 6 is a circuit diagram illustrating the second input latch of FIG. 3A. Because an implementation example of the second input latch, which is described below, is merely an example, the inventive concept is not limited thereto. For example, the second input latch may be implemented by various configurations to which the inventive concept may be applied, and the implementation example of the second input latch may also be applied to a first input latch, for example, the first input latch of FIG. 3A.

Referring to FIG. 6, a second input latch 200a may include third and fourth sub-circuits 210a and 220a. The third sub-circuit 210a may include first, second and third pMOS transistors pTR_11, pTR_21 and pTR_31 and first and second nMOS transistors nTR_11 and nTR_21. The first pMOS transistor pTR_11 may receive a power supply voltage VDD via a source thereof, may receive a second clock signal CLK_A via a gate thereof, and may be coupled to sources of the second and third pMOS transistors pTR_21 and pTR_31 via a drain thereof. The second pMOS transistor pTR_21 may receive the data signal DATA_RX via a gate thereof and may be coupled to a drain of the first nMOS transistor nTR_11 via a drain thereof. The third pMOS transistor pTR_31 may receive the reference voltage VREF via a gate thereof and may be coupled to a drain of the second nMOS transistor nTR_21 via a drain thereof. The first nMOS transistor nTR_11 may receive the second clock signal CLK_A via a gate thereof and may be coupled to the ground node via the drain thereof. The second nMOS transistor nTR_21 may receive the second clock signal CLK_A via a gate thereof and may be coupled to the ground node via the drain thereof. In other words, the drains of both the first and second nMOS transistors nTR_11 and nTR_21 are connected to the ground node.

The third sub-circuit 210a may generate 2-1$^{st}$ and 2-2$^{nd}$ internal signals IN_S12 and IN_S22 by discriminating a value of even data of the data signal DATA_RX, based on the second clock signal CLK_A, the data signal DATA_RX, and the reference voltage VREF. In other words, the value of the even data of the data signal DATA_RX is discriminated by using the second clock signal CLK_A, the data signal DATA_RX, and the reference voltage VREF. The 2-1$^{st}$ internal signal IN_S12 may be output to the fourth sub-circuit 220a via a node to which the drain of the second pMOS transistor pTR_21 and the drain of the first nMOS transistor nTR_11 are coupled, and the 2-2$^{nd}$ internal signal IN_S22 may be output to the fourth sub-circuit 220a via a node to which the drain of the third pMOS transistor pTR_31 and the drain of the second nMOS transistor nTR_21 are coupled. According to an embodiment of the inventive concept, the second clock signal CLK_A may be the negative clock signal CLK_N of FIG. 3A. However, it is to be understood that, when the configuration example of FIG. 6 is applied to the first input latch 110a of FIG. 3A, the second clock signal CLK_A is the positive clock signal CLK_P.

The fourth sub-circuit 220a may include fourth, fifth, sixth and seventh pMOS transistors pTR_12, pTR_22, pTR_32 and pTR_42 and third, fourth, fifth, sixth, seventh, eighth, ninth and tenth nMOS transistors nTR_12, nTR_22, nTR_32, nTR_42, nTR_52, nTR_62, nTR_72, and nTR_82. The fourth pMOS transistor pTR_12 may receive the power supply voltage VDD via a source thereof, may receive the 2-1$^{st}$ internal signal IN_S12 via a gate thereof, and may be coupled to a drain of the third nMOS transistor nTR_12 via a drain thereof. The fifth pMOS transistor pTR_22 may receive the power supply voltage VDD via a source thereof, may be coupled to a gate of the third nMOS transistor nTR_12 via a gate thereof, and may be coupled to the drain of the third nMOS transistor nTR_12 via a drain thereof. The sixth MOS transistor pTR_32 may receive the power supply voltage VDD via a source thereof, may be coupled to a gate of the eighth nMOS transistor nTR_62 via a gate thereof, and may be coupled to a drain of the seventh nMOS transistor nTR_52 via a drain thereof. The seventh pMOS transistor pTR_42 may receive the power supply voltage VDD via a source thereof, may be coupled to a gate of the seventh nMOS transistor nTR_52 via a gate thereof, and may be coupled to the drain of the seventh nMOS transistor nTR_52 via a drain thereof.

The third nMOS transistor nTR_12 may be coupled to a drain of the fourth nMOS transistor nTR_22 via a source thereof. The seventh nMOS transistor nTR_52 may be coupled to a drain of the eighth nMOS transistor nTR_62 via a source thereof. The fourth nMOS transistor nTR_22 may be coupled to drains of the fifth and sixth nMOS transistors nTR_32 and nTR_42 via a source thereof. The fifth nMOS transistor nTR_32 may receive an enable signal EN via a gate thereof and may be coupled to a ground node via a source thereof. The enable signal EN may be a signal capable of continuously turning on the fifth nMOS transistor nTR_32 to generate a positive second output signal OUT_S12P. The positive second output signal OUT_S12P may be output at a node connected to the drain of the third nMOS transistor nTR_12. In some embodiments of the inventive concept, the enable signal EN may correspond to the power supply voltage VDD. The sixth nMOS transistor nTR_42 may receive a positive first output signal OUT_S11P via a gate thereof and may be coupled to the ground node via a source thereof. The eighth nMOS transistor nTR_62 may be coupled to drains of the ninth and tenth nMOS transistors nTR_72 and nTR_82 via a source thereof. The ninth nMOS transistor nTR_72 may receive the enable signal EN via a gate thereof and may be coupled to the ground node via a source thereof. The enable signal EN received by the ninth nMOS transistor nTR_72 may be a signal capable of continuously turning on the ninth nMOS transistor nTR_72 to generate a negative second output signal OUT_S12N. The negative second output signal sOUT_S12N may be output at a node connected to the drain of the seventh nMOS transistor nTR_52. The tenth nMOS transistor nTR_82 may receive a negative first output signal OUT_S11N via a gate thereof and may be coupled to the ground node via a source thereof.

A node coupled to the gate of the fourth pMOS transistor pTR_12 and a gate of the fourth nMOS transistor nTR_22 may receive the 2-$1^{st}$ internal signal IN_S12. A node coupled to the gate of the sixth pMOS transistor pTR_32 and a gate of the eighth nMOS transistor nTR_62 may receive the 2-$2^{nd}$ internal signal IN_S22.

A first output node, which is coupled to the gate of the seventh pMOS transistor pTR_42 and the gate of the seventh nMOS transistor nTR_52 and is coupled to the drains of the fourth and fifth pMOS transistors pTR_12 and pTR_22 and the drain of the third nMOS transistor nTR_12, may output the positive second output signal OUT_S12P. A second output node, which is coupled to the gate of the fifth pMOS transistor pTR_22 and the gate of the third nMOS transistor nTR_12 and is coupled to the drains of the sixth and seventh pMOS transistors pTR_32 and pTR_42 and the drain of the seventh nMOS transistor nTR_52, may output the negative second output signal OUT_S12N.

The fifth and sixth nMOS transistors nTR_32 and nTR_42 and the ninth and tenth nMOS transistors nTR_72 and nTR_82 may constitute a second compensation circuit 221a. The sixth nMOS transistor nTR_42 may be selectively turned on based on the positive first output signal OUT_S11P, thereby selectively increasing the driving strength of a first current path from the first output node to the ground node. The third to sixth nMOS transistors nTR_12 to nTR_42 may be provided along the first current path. The tenth nMOS transistor nTR_82 may be selectively turned on based on the negative first output signal OUT_S11N, thereby selectively increasing the driving strength of a second current path from the second output node to the ground node. The fifth to tenth nMOS transistors nTR_52 to nTR_82 may be provided along the second current path.

Herein, the positive second output signal OUT_S12P and the negative second output signal OUT_S12N may have inverted relationships with respect to each other and may be collectively referred to as a second output signal generated by the second input latch 200a. The positive first output signal OUT_S11P and the negative first output signal OUT_S11N may have inverted relationships with respect to each other and may be collectively referred to as a first output signal, which is feedback that is received from the first input latch 110a (FIG. 3).

Figure 7:
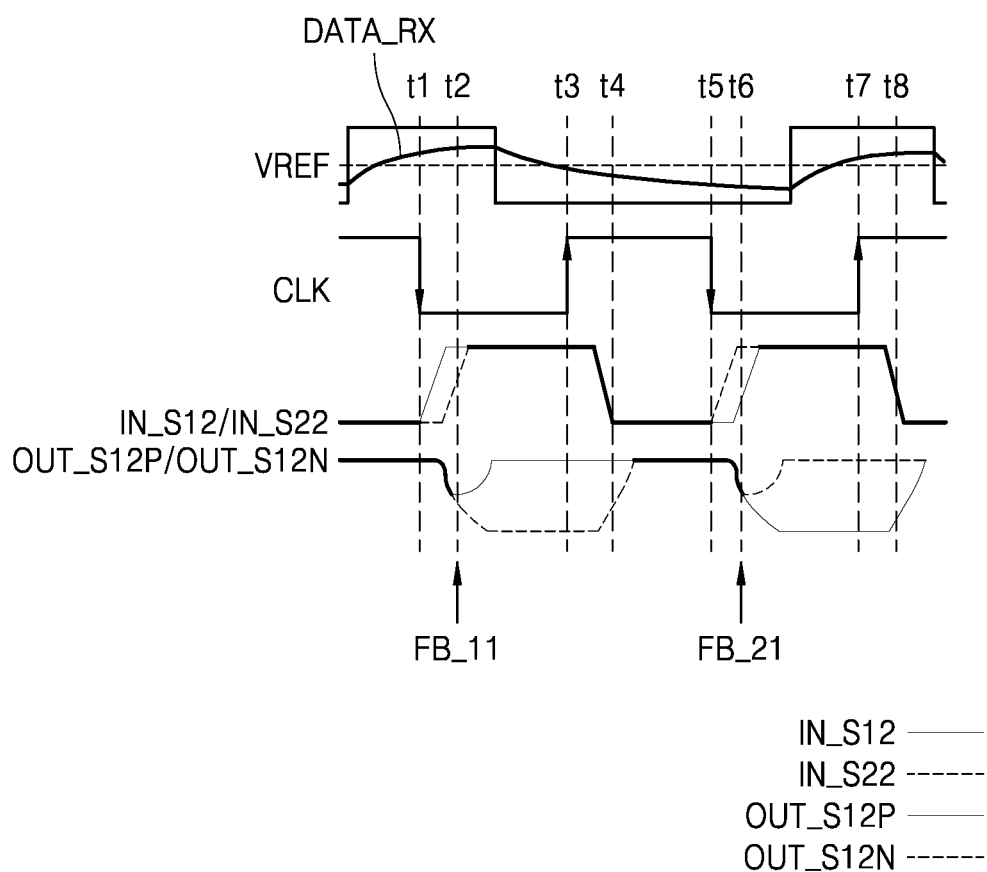
FIG. 7 is a timing diagram illustrating an operation of the second input latch of FIG. 6.

FIG. 7 is a timing diagram illustrating an operation of the second input latch of FIG. 6.

Referring to FIGS. 6 and 7, at first and fifth time points t1 and t5, which are falling edge timings of a clock signal CLK, the second input latch 200a may discriminate a value of even data, which is included in the data signal DATA_RX, and generate and output second output signals OUT_S12P and OUT_S12N. For example, at the first time point t1, the third sub-circuit 210a may compare the reference voltage VREF with first even data, which is included in the data signal DATA_RX, and may generate the 2-$1^{st}$ internal signal IN_S12 and the 2-$2^{nd}$ internal signal IN_S22, which indicate that the first even data is greater than the reference voltage VREF. A timing at which the 2-$2^{nd}$ internal signal IN_S22 transits from a low level to a high level may be later than a timing at which the 2-$1^{st}$ internal signal IN_S12 transits from a low level to a high level. As described above, a difference between transition timings of the 2-$2^{nd}$ internal signal IN_S22 and the 2-$1^{st}$ internal signal IN_S12 may be reduced due to intersymbol interference or the like. Therefore, the fourth sub-circuit 220a may receive feedback FB_11 from the first input latch 110a (FIG. 3A) at the second time point t2 to compensate for the reduced difference.

The fourth sub-circuit 220a may receive, from the first input latch 110a (FIG. 3A), the positive first output signal OUT_S11P and the negative first output signal OUT_S11N, which correspond to first odd data received as the feedback FB_11 earlier than the first even data. When a value of the first odd data is "0", the sixth nMOS transistor nTR_42 may be turned off because the positive first output signal OUT_S11P is at a low level, and the tenth nMOS transistor nTR_82 may be turned on because the negative first output signal OUT_S11N is at a high level. Thus, the driving strength of the second current path to the ground node from the second output node, which is coupled to the gate of the sixth pMOS transistor pTR_42 and the gate of the seventh nMOS transistor nTR_52, may be increased by the tenth nMOS transistor nTR_82. Accordingly, a voltage of the second output node may quickly fall as compared with a voltage of the first output node, and as a result, a positive second output signal OUT_S12P having a high level and a negative second output signal OUT_S12N having a low level may be output.

At third and seventh time points t3 and t7, which are rising edge timings of the clock signal CLK, the first input latch 110a (FIG. 3A) may discriminate a value of odd data, which is included in the data signal DATA_RX, and generate and output a first output signal. The second input latch 200a may provide the second output signals OUT_S12P and OUT_S12N as feedback to the first input latch 110a (FIG. 3A) at fourth and eighth time points t4 and t8. Since the discrimination process at the third and seventh time points t3 and t7 is similar to that described for the first and fifth time points t1 and t5, descriptions thereof are omitted.

Next, at a fifth time point t5, the third sub-circuit 210a may compare the reference voltage VREF with second even data, which is included in the data signal DATA_RX, and may generate the 2-1$^{st}$ internal signal IN_S12 and the 2-2$^{nd}$ internal signal IN_S22, which indicate that the second even data is less than the reference voltage VREF. A timing at which the 2-2$^{nd}$ internal signal IN_S22 transits from a low level to a high level may be earlier than a timing at which the 2-1$^{st}$ internal signal IN_S12 transits from a low level to a high level. When a value of the second even data is "0" and a value of second odd data, which is received earlier than the second even data, is also "0", because there is a sufficient difference between the reference voltage VREF and the second even data, the second input latch 200a may easily discriminate the value of the second even data, and the influence of feedback FB_21, which is received from the first input latch 110a (FIG. 3A) by the second input latch 200a at a sixth time point t6, may be ignored.

The second compensation circuit 221a may selectively increase driving strength of a current path to the ground node from one of the first and second output nodes, based on the first output signals OUT_S11P and OUT_S11N, which are feedback corresponding to previous data, such that current data is allowed to be quickly and accurately discriminated, and an effect of improving performance may be remarkable particularly when values of the previous data and the current data are different from each other.

FIGS. 8A to 9B are diagrams illustrating that a degree of adjustment of driving strength is to be controlled by a compensation circuit according to a state of a channel. The following descriptions will be made based on the second input latch 200a described with reference to FIG. 6, and it is apparent that the following descriptions may also be applied to the first input latch 110a (FIG. 3A).

Figure 8A:
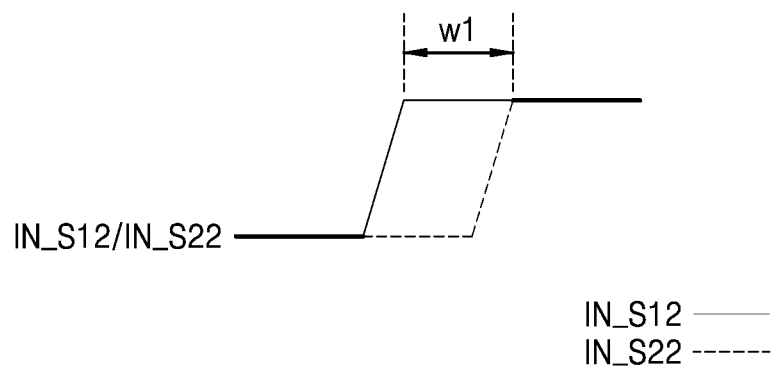
FIGS. 8A, 8B, 9A and 9B are diagrams illustrating that a degree of adjustment of driving strength is to be controlled by a compensation circuit according to a state of a channel.
Figure 8B:
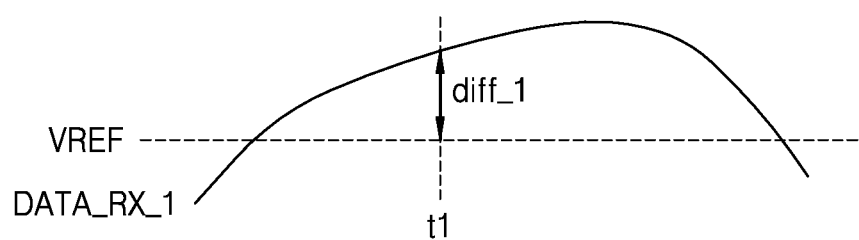

Referring to FIG. 8B, when a state of a channel is relatively good, a difference diff_1 between the reference voltage VREF and a data signal DATA_RX_1, which has passed through the channel, at the first time point t1 may be relatively sufficient to discriminate a value of even data, and thus, as shown in FIG. 8A, because a difference w1 between the transition timings of the 2-1$^{st}$ internal signal IN_S12 and the 2-2$^{nd}$ internal signal IN_S22 may be relatively sufficient, an effect according to the inventive concept may be achieved even though a degree of adjustment of the driving strength by the second compensation circuit is relatively small.

Figure 9A:
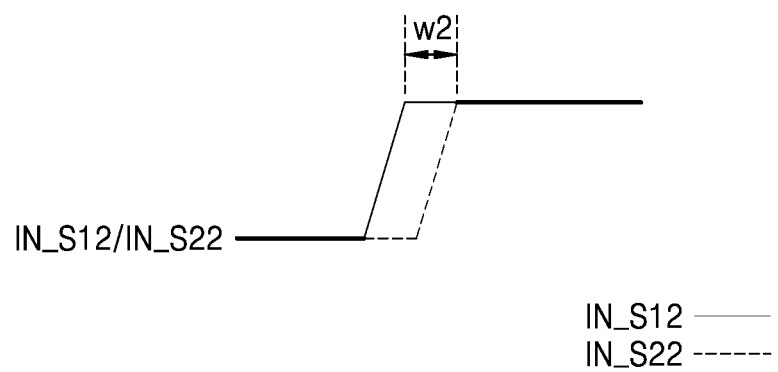
Figure 9B:
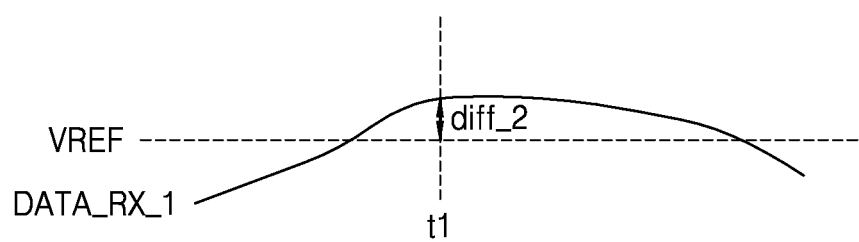

Referring to FIG. 9B, when the state of the channel is relatively poor, because a difference diff_2 between the reference voltage VREF and a data signal DATA_RX_2, which has passed through the channel, at the first time point t1 is small, a value of even data of the data signal DATA_RX_2 may not be discriminated. Accordingly, as shown in FIG. 9A, a difference w2 between the transition timings of the 2-1$^{st}$ internal signal IN_S12 and the 2-2$^{nd}$ internal signal IN_S22 may not be sufficient, the effect according to the inventive concept may be achieved only when the degree of adjustment of the driving strength by the second compensation circuit is greater than that of FIG. 8A.

In other words, the state of the channel may vary due to various factors such as a fabrication process or an operation environment of the system 1 (FIG. 1) including the channel, and the second compensation circuit according to an embodiment of the inventive concept may adaptively control the degree of adjustment of the driving strength according to the state of the channel (or a state of intersymbol interference). For example, when the state of the channel is relatively poor, the second compensation circuit may increase the degree of adjustment of the driving strength, and when the state of the channel is relatively good, the second compensation circuit may reduce the degree of adjustment of the driving strength. However, the second compensation circuit may control the degree of adjustment of the driving strength by considering, in addition to the state of the channel, various factors that hinder the discrimination of a value of data included in a data signal.

Figure 10A:
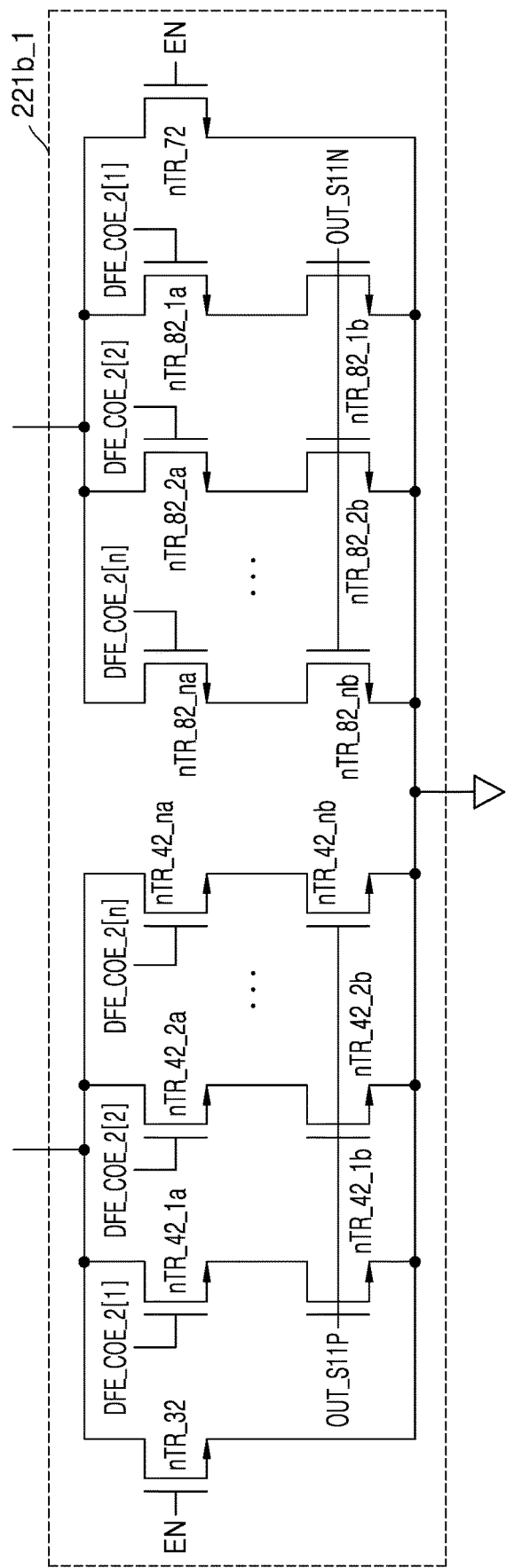
FIGS. 10A and 10B are each a circuit diagram according to an implementation example of a second enhanced compensation circuit of FIG. 5.
Figure 10B:
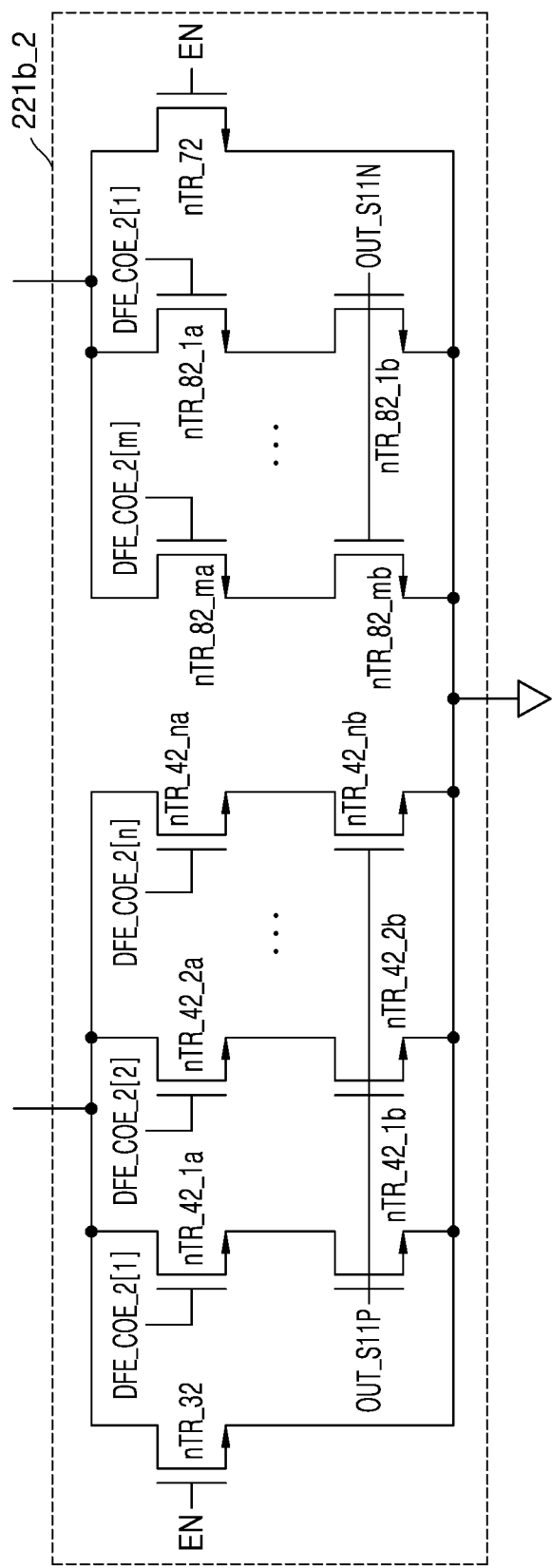

FIGS. 10A and 10B are each a circuit diagram according to an implementation example of the second enhanced compensation circuit of FIG. 5. Configurations of second enhanced compensation circuits 221b_1 and 221b_2, which are described below, may also be applied to the first enhanced compensation circuit 114a_13 of FIG. 5, and each of the second enhanced compensation circuits 221b_1 and 221b_2 may substitute for the second compensation circuit 221a of the fourth sub-circuit 220a of FIG. 6.

Referring to FIG. 10A, the second enhanced compensation circuit 221b_1 may include the fifth nMOS transistor nTR_32, 6-1$^{st}$ nMOS transistors nTR_42_1a to nTR_42_na, 6-2$^{nd}$ nMOS transistors nTR_42_1b to nTR_42_nb, the ninth nMOS transistor nTR_72, 10-1$^{st}$ nMOS transistors nTR_82_1a to nTR_82_na, and 10-2$^{nd}$ nMOS transistors nTR_82_1b to nTR_82_nb.

In an embodiment of the inventive concept, the 6-1$^{st}$ nMOS transistors nTR_42_1a to nTR_42_na may be respectively coupled in series to the 6-2$^{nd}$ nMOS transistors nTR_42_1b to nTR_42_nb. As an example, the 6-1$^{st}$ nMOS transistor nTR_42_1a may be connected in series to the 6-2$^{nd}$ nMOS transistor nTR_42_1b. Sources of the 6-1$^{st}$ nMOS transistors nTR_42_1a to nTR_42_na may be respectively coupled to drains of the corresponding 6-2$^{nd}$ nMOS transistors nTR_42_1b to nTR_42_nb. The 10-1$^{st}$ nMOS transistors nTR_82_1a to nTR_82_na may be respectively coupled in series to the 10-2$^{nd}$ nMOS transistors nTR_82_1b to nTR_82_nb. Sources of the 10-1$^{st}$ nMOS transistors nTR_82_1a to nTR_82_na may be respectively coupled to drains of the corresponding 10-2$^{nd}$ nMOS transistors nTR_82_1b to nTR_82_nb. As an example, the source of the 10-1$^{st}$ nMOS transistor nTR_82_1a may be coupled to the drain of the of the 10-2$^{nd}$ nMOS transistor nTR_82_1b. Drains of the 6-1$^{st}$ nMOS transistors nTR_42_1a to nTR_42_na may be coupled to the source of the fourth nMOS transistor nTR_22 of FIG. 6, and drains of the 10-1$^{st}$ nMOS transistors nTR_82_1a to nTR_82_na may be coupled to the source of the eighth nMOS transistor nTR_62.

In an embodiment of the inventive concept, the second enhanced compensation circuit 221b_1 may receive a second coefficient signal DFE_COE_2[1:n] (where n is an integer equal to or greater than 2) and the first output signals OUT_S11P and OUT_S11N from the outside. The second coefficient signal DFE_COE_2[1:n] may include a plurality of bits, in other words, n bits. The plurality of bits of the second coefficient signal DFE_COE_2[1:n] may be provided to gates of the 6-1$^{st}$ nMOS transistors nTR_42_1a to nTR_42_na respectively corresponding thereto and to gates of the 10-1$^{st}$ nMOS transistors nTR_82_1a to nTR_82_na respectively corresponding thereto. The positive first output signal OUT_S11P may be provided to gates of the 6-2$^{nd}$ nMOS transistors nTR_42_1b to nTR_42_nb, and the negative first output signal OUT_S11N may be provided to gates of the 10-2$^{nd}$ nMOS transistors nTR_82_1b to nTR_82_nb.

By using the above-described configuration, in the 6-$1^{st}$ nMOS transistors nTR_42_1a to nTR_42_na and the 10-$1^{st}$ nMOS transistors nTR_82_1a to nTR_82_na, the number of transistors, which are turned on in response to the second coefficient signal DFE_COE_2[1:n], may be determined. In other words, the second coefficient signal DFE_COE_2[1:n] may indicate how many transistors are turned on or off in the second enhanced compensation circuit 221b_1. As the number of transistors turned on is increased, a degree of adjustment of driving strength by the second enhanced compensation circuit 221b_1 may be increased, and as the number of transistors turned on is decreased, the degree of adjustment of the driving strength by the second enhanced compensation circuit 221b_1 may be decreased.

Referring further to FIG. 10B, as compared with FIG. 10A, in the second enhanced compensation circuit 221b_2, the number of 6-$1^{st}$ nMOS transistors nTR_42_1a to nTR_42_na may be different from the number of 10-$1^{st}$ nMOS transistors nTR_82_1a to nTR_82_ma (where m is an integer equal to or greater than 1). In addition, the number of 6-$2^{nd}$ nMOS transistors nTR_42_1b to nTR_42_nb may be different from the number of 10-$2^{nd}$ nMOS transistors nTR_82_1b to nTR_82_mb. Accordingly, the number of bits of the second coefficient signal DFE_COE_2[1:n], which are respectively received by the gates of the 6-$1^{st}$ nMOS transistors nTR_42_1a to nTR_42_na, may be different from the number of bits of a second coefficient signal DFE_COE_2[1:m], which are respectively received by gates of the 10-$1^{st}$ nMOS transistors nTR_82_1a to nTR_82_ma.

Figure 11:
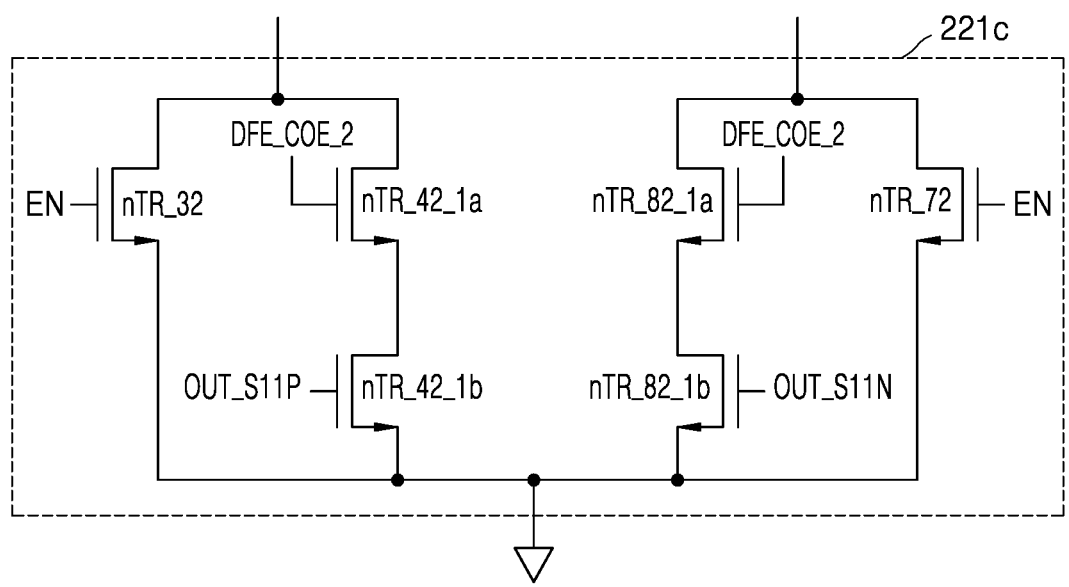
FIG. 11 is a circuit diagram according to another implementation example at the second enhanced compensation circuit of FIG. 5.

FIG. 11 is a circuit diagram according to another implementation example of the second enhanced compensation circuit of FIG. 5. A configuration of a second enhanced compensation circuit 221c, which is described below, may also be applied to the first enhanced compensation circuit 114a_13 of FIG. 5, and the second enhanced compensation circuit 221c may substitute for the second compensation circuit 221a of the fourth sub-circuit 220a of FIG. 6.

Referring to FIG. 11, the second enhanced compensation circuit 221c may include the fifth nMOS transistor nTR_32, a 6-$1^{st}$ nMOS transistor nTR_42_1a, a 6-$2^{nd}$ nMOS transistor nTR_42_1b, the ninth nMOS transistor nTR_72, a 10-$1^{st}$ nMOS transistor nTR_82_1a, and a 10-$2^{nd}$ nMOS transistor nTR_82_1b.

In an embodiment of the inventive concept, the 6-$1^{st}$ nMOS transistor nTR_42_1a may be coupled in series to the 6-$2^{nd}$ nMOS transistor nTR_42_1b. A source of the 6-$1^{st}$ nMOS transistor nTR_42_1a may be coupled to a drain of the 6-$2^{nd}$ nMOS transistor nTR_42_1b. The 10-$1^{st}$ nMOS transistor nTR_82_1a may be coupled in series to the 10-$2^{nd}$ nMOS transistor nTR_82_1b. A source of the 10-$1^{st}$ nMOS transistor nTR_82_1a may be coupled to a drain of the 10-$2^{nd}$ nMOS transistor nTR_82_1b. A drain of the 6-$1^{st}$ nMOS transistor nTR_42_1a may be coupled to the source of the fourth nMOS transistor nTR_22 of FIG. 6, and a drain of the 10-$1^{st}$ nMOS transistor nTR_82_1a may be coupled to the source of the eighth nMOS transistor nTR_62.

In an embodiment of the inventive concept, the second enhanced compensation circuit 221c may receive a second coefficient signal DFE_COE_2 of an analog type and the first output signals OUT_S11P and OUT_S11N from the outside. The second coefficient signal DFE_COE_2 may be provided to a gate of the 6-$1^{st}$ nMOS transistor nTR_42_1a and a gate of the 10-$1^{st}$ nMOS transistor nTR_82_1a. The positive first output signal OUT_S11P may be provided to a gate of the 6-$2^{nd}$ nMOS transistor nTR_42_1b, and the negative first output signal OUT_S11N may be provided to a gate of the 10-$2^{nd}$ nMOS transistor nTR_82_1b.

By using the above-described configuration, resistance values of the 6-$1^{st}$ nMOS transistor nTR_42_1a and the 10-$1^{st}$ nMOS transistor nTR_82_1a may be determined in response to the second coefficient signal DFE_COE_2. In other words, the resistance values of the 6-$1^{st}$ nMOS transistor nTR_42_1a and the 10-$1^{st}$ nMOS transistor nTR_82_1a may be adjusted by the second coefficient signal DFE_COE_2. In an embodiment of the inventive concept, the second coefficient signal DFE_COE_2 may have a variable voltage level. For example, as the magnitude of the second coefficient signal DFE_COE_2 is increased, the resistance values of the 6-$1^{st}$ nMOS transistor nTR_42_1a and the 10-$1^{st}$ nMOS transistor nTR_82_1a are reduced, and thus, a degree of adjustment of driving strength by the second enhanced compensation circuit 221c may be increased. As the magnitude of the second coefficient signal DFE_COE_2 is reduced, the resistance values of the 6-$1^{st}$ nMOS transistor nTR_42_1a and the 10-$1^{st}$ nMOS transistor nTR_82_1a are increased, and thus, the degree of adjustment of the driving strength by the second enhanced compensation circuit 221c may be reduced.

Because the implementation examples of the second compensation circuits 221b_1, 221b_2, and 221c shown in FIGS. 10A, 10B, and 11 are merely examples, the inventive concept is not limited thereto. For example, implementations may be made to control the degree of adjustment of the driving strength in various manners, and the described implementation examples may be combined with each other.

Figure 12:
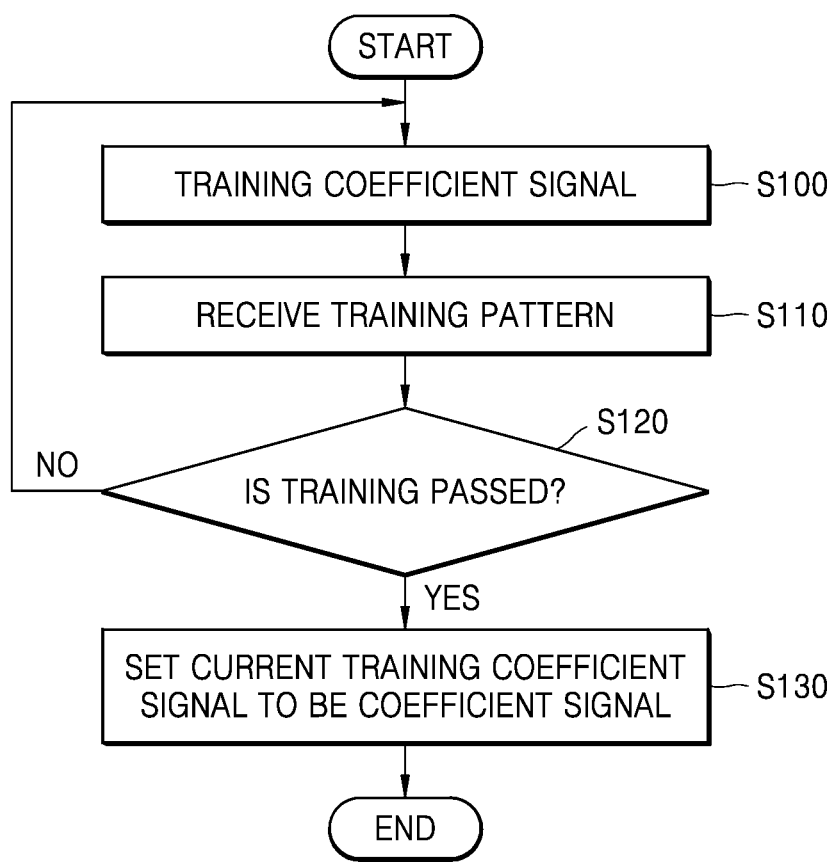
FIG. 12 is a flowchart illustrating a training operation of a device for setting a coefficient signal provided to a compensation circuit, according to an embodiment of the inventive concept.

FIG. 12 is a flowchart illustrating a training operation of a device for setting a coefficient signal provided to a compensation circuit, according to an embodiment of the inventive concept.

Referring to FIG. 12, in operation S100, a device may set a training coefficient signal to be a certain value. In operation S110, the device may receive a training pattern via a channel. Next, an equalizer included in the device may receive the training coefficient signal and perform an equalization operation on the training pattern based on the training coefficient signal. In operation S120, the device may determine whether training is passed, by comparing the equalized training pattern with a reference pattern. When "YES" is given in operation S120, subsequently in operation S130, the device may set the current training coefficient signal to be a coefficient signal. For example, the training coefficient signal may be set to be one of the first or second coefficient signals DFE_COE_1 or DFE_COE_2. When the equalizer is operated according to embodiments of the inventive concept, the set coefficient signal may be provided to the equalizer. When "NO" is given in operation S120, subsequently in operation S100, the training operation may be repeated by setting the training coefficient signal to be another value.

Figure 13A:
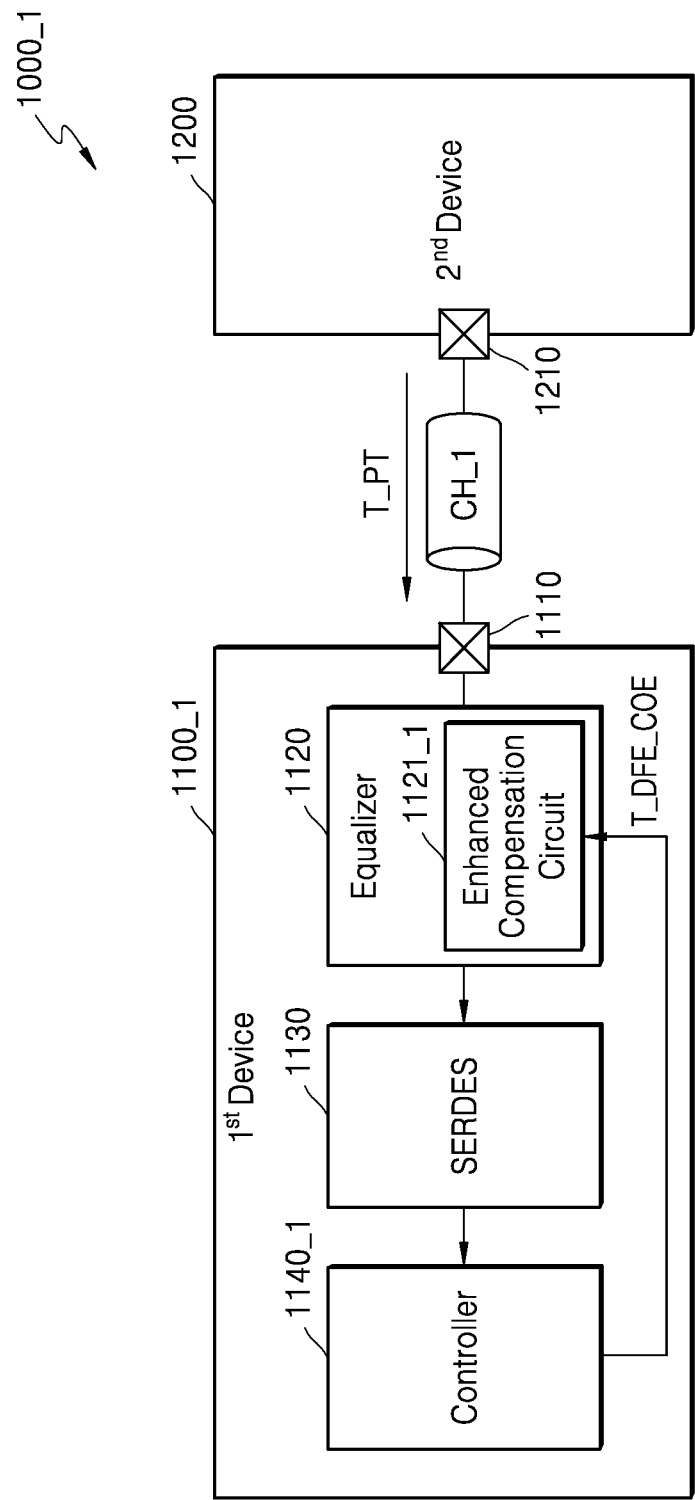
FIGS. 13A and 13B are block diagrams each illustrating a system for performing a training operation to set a coefficient signal, according to an embodiment of the inventive concept.
Figure 13B:
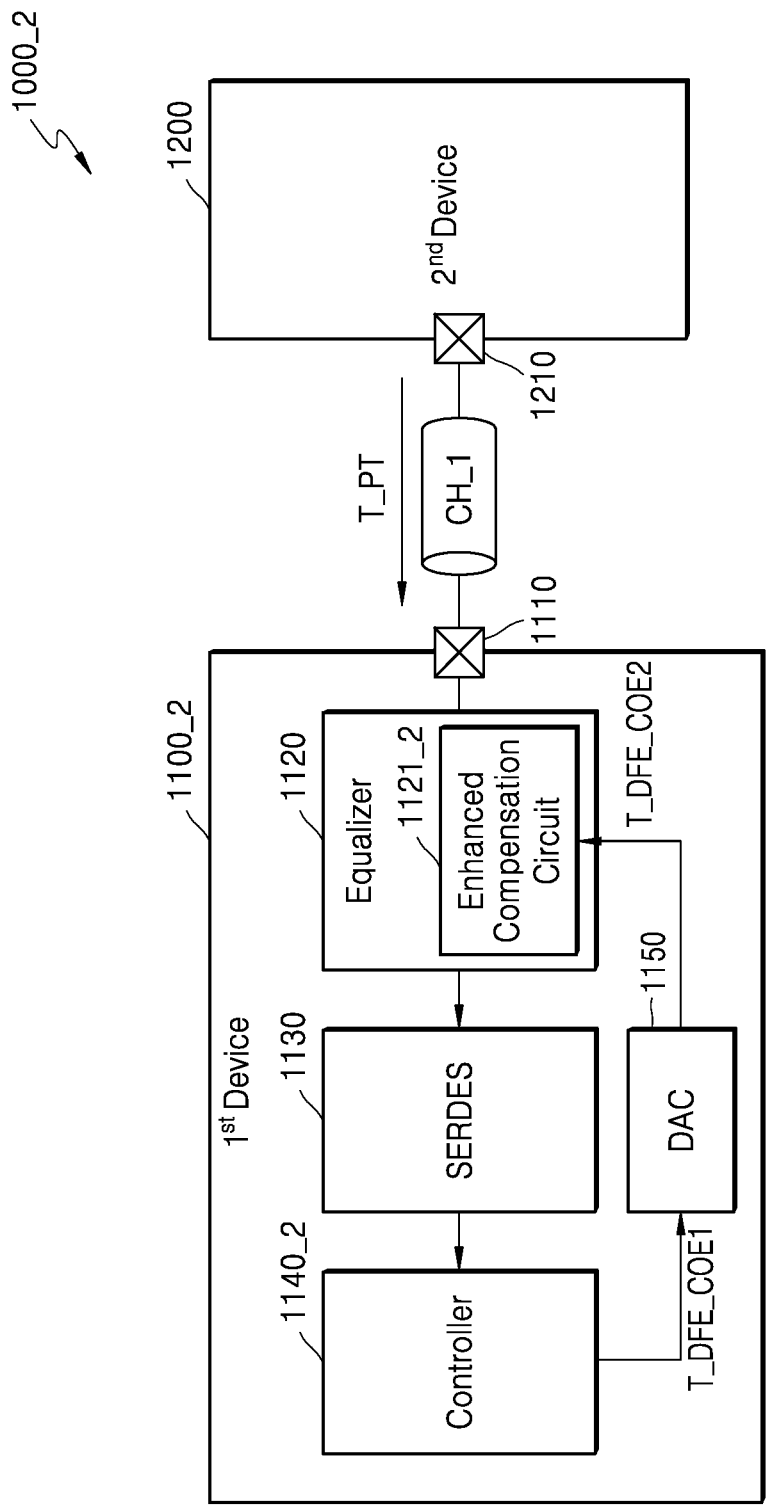

FIGS. 13A and 13B are block diagrams respectively illustrating systems 1000_1 and 1000_2 for performing training operations to set coefficient signals, according to an embodiment of the inventive concept.

Referring to FIG. 13A, the system 1000_1 may include the first channel CH_1 and first and second devices 1100_1 and 1200. The first device 1100_1 may include a reception pad 1110, an equalizer 1120, a SERDES 1130, and a controller 1140_1. The equalizer 1120 may include an enhanced compensation circuit 1121_1, and the above-described embodiments of the inventive concept may be applied thereto. The controller 1140_1 may control functional circuits of the first device 1100_1. In some embodiments of the inventive concept, the controller 1140_1 may include a built-in self-test (BIST) circuit and may control a training operation for setting a coefficient signal, which is provided to the enhanced compensation circuit 1121_1, by using the BIST circuit.

First, a training pattern T_PT transmitted from the second device 1200 may be transferred to the reception pad 1110 of the first device 1100_1 via the first channel CH_1. The training pattern T_PT may include a plurality of pieces of training data having suitable patterns to set the coefficient signal. The controller 1140_1 may provide, to the enhanced compensation circuit 1121_1, a training coefficient signal T_DFE_COE that is set such that a plurality of bits thereof have certain values. Here, the training coefficient signal T_DFE_COE may be a digital signal. The enhanced compensation circuit 1121_1 may set a degree of adjustment of driving strength in advance, based on the training coefficient signal T_DFE_COE. The equalizer 1120 may equalize the training pattern T_PT by using the enhanced compensation circuit 1121_1. The SERDES 1130 may deserialize the equalized training pattern T_PT and provide the deserialized training pattern T_PT to the controller 1140_1. The controller 1140_1 may compare the received training pattern T_PT with a reference pattern and may determine whether to repeat or terminate the training, based on a result of the comparison. In other words, the controller 1140_1 may determine whether the training is passed or failed. For example, when a difference between the received training pattern T_PT and the reference pattern is equal to or greater than a threshold value, the controller 1140_1 may consider the training as being failed, change the values of the plurality of bits to other values, and provide the other values to the enhanced compensation circuit 1121_1 as a new training coefficient signal T_DFE_COE, thereby repeating the training operation. When the difference between the received training pattern T_PT and the reference pattern is less than the threshold or acceptable value, the controller 1140_1 may consider the training as being passed and set the current training coefficient signal T_DFE_COE to be a coefficient signal. The coefficient signal, which is set as such, may be provided to the enhanced compensation circuit 1121_1 during an equalization operation of the equalizer 1120.

Referring to FIG. 13B, a first device 1100_2 of the system 1000_2 may further include a digital-to-analog converter (DAC) 1150, as compared with FIG. 13A. A controller 1140_2 may provide, to the DAC 1150, a first training coefficient signal T_DFE_COE1 that is set such that a plurality of bits thereof have certain values. The DAC 1150 may generate a second training coefficient signal T_DFE_COE2 by performing digital-to-analog conversion on the first training coefficient signal T_DFE_COE1 and provide the second training coefficient signal T_DFE_COE2 to an enhanced compensation circuit 1121_2. When the training is failed, the controller 1140_2 may change the values of the plurality of bits of the first training coefficient signal T_DFE_COE1 to other values and provide the other values to the DAC 1150, thereby repeating the training operation. When the training is passed, the controller 1140_2 may fix the current first training coefficient signal T_DFE_COE1 such that the current second training coefficient signal T_DFE_COE2 is set to be a coefficient signal. In other words, during an operation of the equalizer 1120, the controller 1140_2 may provide the fixed first training coefficient signal T_DFE_COE1 to the DAC 1150, and the DAC 1150 may provide the second training coefficient signal T_DFE_COE2 to the enhanced compensation circuit 1121_2 by converting the first training coefficient signal T_DFE_COE1.

Figure 14:
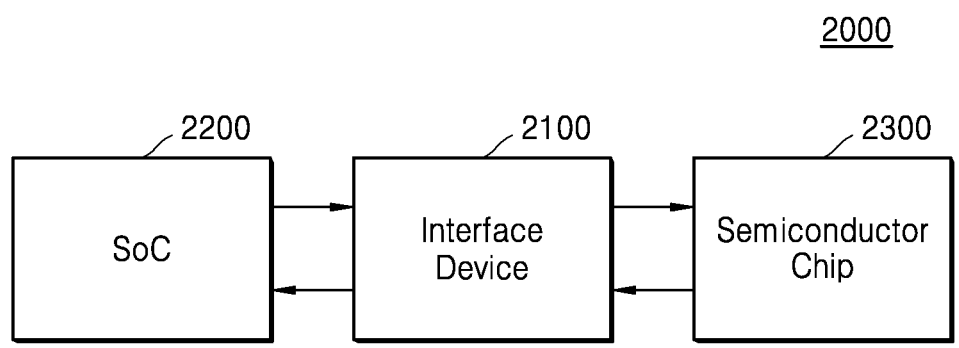
FIGS. 14 and 15 are diagrams illustrating a system to which embodiments of the inventive concept are applied.
Figure 15:
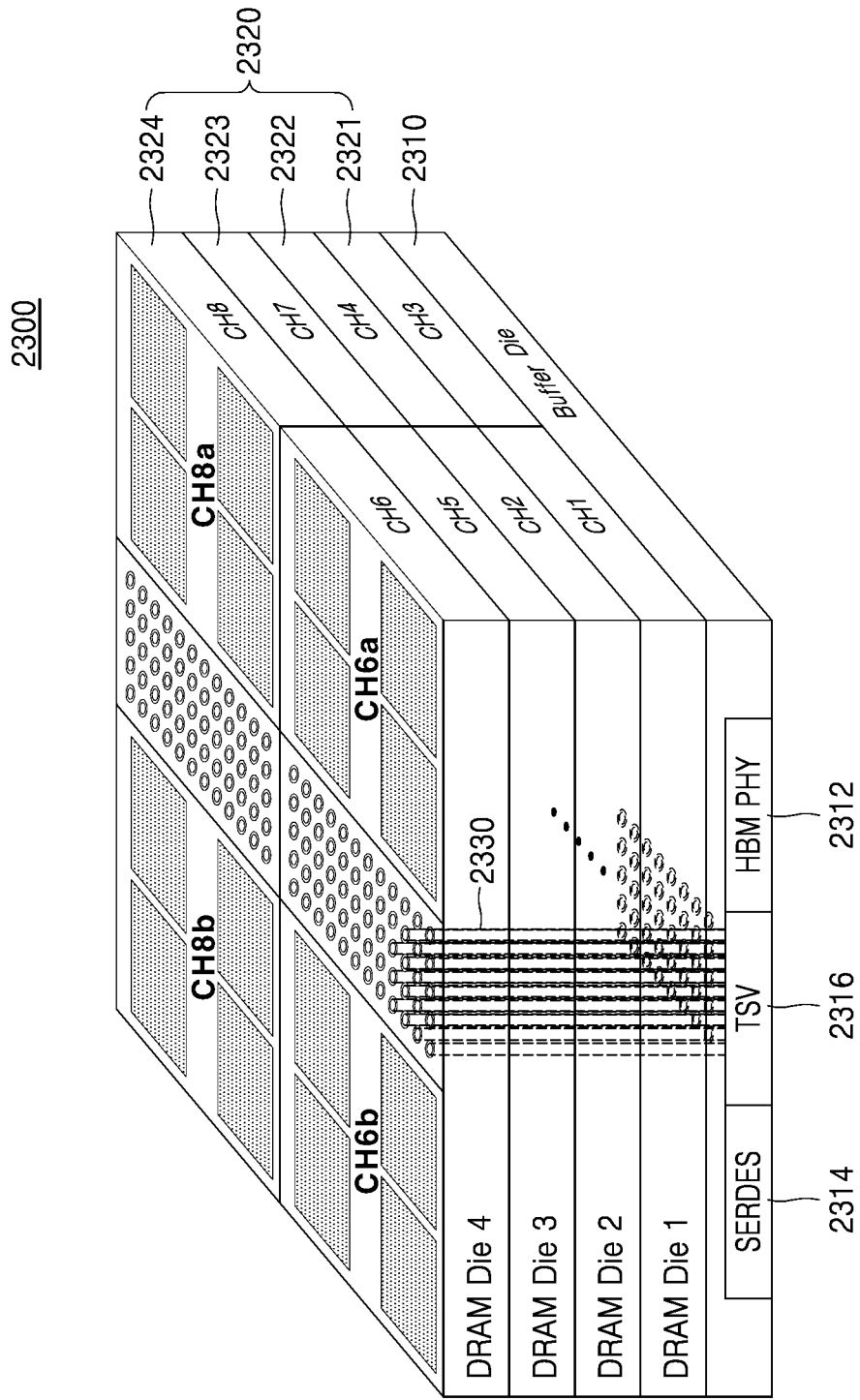

FIGS. 14 and 15 are diagrams illustrating a system to which embodiments of the inventive concept are applied.

Referring to FIG. 14, a system 2000 may include a system-on-chip (SoC) 2200, an interface device (or an interface chip) 2100, to which embodiments of the inventive concept are applied, and a semiconductor chip 2300. In some embodiments of the inventive concept, the SoC 2200 may be a processing device, and the semiconductor chip 2300 may be a memory device. The SoC 2200 may perform, as an application processor, a function of a host. The SoC 2200 may include a system bus, to which a protocol having a certain standard bus specification is applied, and may include various IPs coupled to the system bus.

As a standard specification of the system bus, an Advanced Microcontroller Bus Architecture (AMBA) protocol by Advanced RISC Machine (ARM) Co., Ltd. may be applied. Bus types of the AMBA protocol may include Advanced High-Performance Bus (AHB), Advanced Peripheral Bus (APB), Advanced eXtensible Interface (AXI), AXI4, AXI Coherency Extensions (ACE), and the like. In addition, other types of protocols, such as uNetwork by SONICs Inc., CoreConnect by IBM, or Open Core Protocol by OCPIP, may also be applied.

A reference is further made to FIG. 15 to describe a configuration of the semiconductor chip 2300. The semiconductor chip 2300 may be a high bandwidth memory (HBM), which includes a plurality of channels CH1 to CH8 having interfaces independent of each other. The semiconductor chip 2300 may include a plurality of dies, for example, a buffer die 2310 and a plurality of memory dies 2320 stacked on the buffer die 2310. For example, a first memory die 2321 may include a first channel CH1 and a third channel CH3, a second memory die 2322 may include a second channel CH2 and a fourth channel CH4, a third memory die 2323 may include a fifth channel CH5 and a seventh channel CH7, and a fourth memory die 2324 may include a sixth channel CH6 and an eighth channel CH8. The first to fourth memory dies 2321 to 2324 may be dynamic random access memory (DRAM) dies, but the inventive concept is not limited thereto.

The buffer die 2310 may be coupled to the interface device 2100 via conductive means, for example, bumps or solder balls, which are formed on an outer surface of the semiconductor chip 2300. The buffer die 2310 may receive a command, an address, and data from the SoC 2200 via the interface device 2100 and may provide the received command, address, and data to a channel of at least one of the plurality of memory dies 2320. In addition, the buffer die 2310 may provide data, which is output from a channel of at least one of the plurality of memory dies 2320, to the SoC 2200 via the interface device 2100.

The semiconductor chip 2300 may include a plurality of through-silicon vias (TSVs) 2330, which penetrate the plurality of memory dies 2320. Each of the channels CH1 to CH8 may be arranged dividedly on left and right sides of the TSVs 2330, and, for example, in the fourth memory die 2324, the sixth channel CH6 may be separated into pseudo channels CH6a and CH6b and the eighth channel CH8 may be separated into pseudo channels CH8a and CH8b. The TSVs 2330 may be arranged between the pseudo channels CH6a and CH6b of the sixth channel CH6 and between the pseudo channels CH8a and CH8b of the eighth channel CH8.

The buffer die 2310 may include a TSV area 2316, a SERDES area 2314, and an HBM physical layer interface area, in other words, an HBM PHY area 2312. The TSV area 2316 is an area in which the TSVs 2330 for communication with the plurality of memory dies 2320 are formed.

The SERDES area 2314 is an area in which a SERDES interface conforming to Joint Electron Device Engineering Council (JEDEC) standards is provided, as processing throughput of the SoC 2200 is increased and demands for memory bandwidths are increased. The SERDES area 2314 may include a SERDES transmitter portion, a SERDES receiver portion, and a controller portion. The SERDES transmitter portion may include a parallel-to-serial circuit and a transmitter, may receive a parallel data stream, and may serialize the received parallel data stream. The SERDES receiver portion may include an amplifier, an equalizer, a clock and data recovery (CDR) circuit, and a serial-to-parallel circuit, may receive a serial data stream, and may deserialize the received serial data stream. The controller portion includes an error detection circuit, an error correction circuit, and registers such as first-in first-out (FIFO) registers.

The HBM PHY area 2312 may include physical or electrical layers and logical layers, which are provided for signals, frequencies, timings, driving, detailed operation parameters, and functionality required for efficient communication between the SoC 2200 and the semiconductor chip 2300. The HBM PHY area 2312 may perform memory interfacing such as selecting a row and a column, which correspond to a memory cell, writing data to a memory cell, or reading written data. The HBM PHY area 2312 may support features of an HBM protocol conforming to the JEDEC standards.

The interface device 2100 may include an equalizer according to embodiments of the inventive concept. The interface device 2100 may equalize a data signal, which is provided by the SoC 2200, to transfer the equalized data signal to the semiconductor chip 2300, and may equalize a data signal, which is provided by the semiconductor chip 2300, to transfer the equalized data signal to the SoC 2200.

The interface device 2100 may perform interfacing such that data communication between the SoC 2200 and the semiconductor chip 2300 is smoothly performed. The interface device 2100 may quickly and accurately equalize a data signal with low power, according to embodiments of the inventive concept, thereby improving the reception quality of the SoC 2200 and the semiconductor chip 2300 and, as a result, improving the overall performance of the system 2000.

Figure 16:
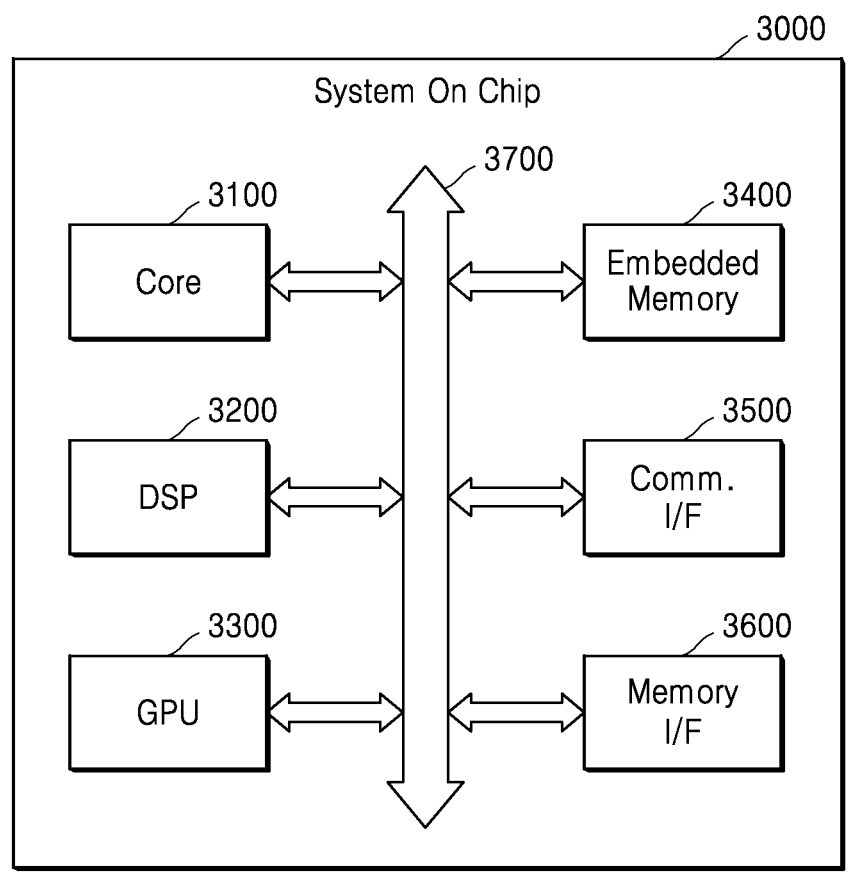
FIG. 16 is a block diagram illustrating a system-on-chip according to an embodiment of the inventive concept.

FIG. 16 is a block diagram illustrating an SoC according to an embodiment of the inventive concept. The SoC may be an integrated circuit in which parts of a computing system or another electronic system are integrated. For example, an application processor (AP) as one of SoCs may include a processor, and parts for other functions.

Referring to FIG. 16, a SoC 3000 may include a core 3100, a digital signal processor (DSP) 3200, a graphics processing unit (GPU) 3300, an embedded memory 3400, a communication interface 3500, and a memory interface 3600. The components of the SoC 3000 may communicate with each other via a bus 3700.

The core 3100 may process instructions and may control operations of components included in the SoC 3000. For example, the core 3100 may run an operating system and execute applications on the operating system, by processing a series of instructions. The DSP 3200 may generate useful data by processing a digital signal, for example, a digital signal provided by the communication interface 3500. The GPU 3300 may generate data for images, which are output via a display device, from image data provided by the embedded memory 3400 or the memory interface 3600, and may encode the image data. The embedded memory 3400 may store data required to operate the core 3100, the DSP 3200, and the GPU 3300. The memory interface 3600 may provide an interface for memory external to the SoC 3000, for example, dynamic random access memory (DRAM) or flash memory.

The communication interface 3500 may provide serial communication with the outside of the SoC 3000. For example, the communication interface 3500 may access Ethernet and may include a SERDES for serial communication.

An equalizer, to which embodiments of the inventive concept are applied, may be applied to the communication interface 3500 and/or the memory interface 3600. For example, the communication interface 3500 and/or the memory interface 3600 may equalize a data signal by using configurations and methods according to embodiments of the inventive concept.

While the inventive concept has been particularly shown and described with reference to embodiments thereof, it will be understood that various changes in form and details may be made therein without departing from the spirit and scope of the following claims.

What is claimed is:

1. A decision feedback equalizer, comprising:
    a first input latch configured to generate a first output signal from first data,
    wherein the first input latch comprises:
    a first sub-circuit configured to receive the first data and a reference voltage, compare the first data and the reference voltage, and generate first internal signals having different transition timings according to a result of the comparison between the first data and the reference voltage; and
    a second sub-circuit configured to receive, as first feedback, a second output signal, which corresponds to second data that is received from a second input latch earlier than the first data, and generate the first output signal, which compensates for a difference between the transition timings of the first internal signals, based on the first feedback,
    wherein the second sub-circuit comprises a compensation circuit coupled to a ground node and configured to adjust a driving strength of a current path from a node that is configured to generate the first output signal based on the first feedback to the ground node.

2. The decision feedback equalizer of claim 1, further comprising:
    the second input latch configured to generate the second output signal from the second data.

3. The decision feedback equalizer of claim 2, wherein the second output signal is a return-to-zero signal, and
    the decision feedback equalizer further comprises: a middle latch configured to convert the second output signal into a non-return-to-zero signal; and
    an output latch configured to output the converted second output signal in synchronization with a clock signal.

4. The decision feedback equalizer of claim 3, wherein the first feedback is the second output signal converted by the middle latch.

5. The decision feedback equalizer of claim 1, wherein the compensation circuit is further configured to receive a coefficient signal to control a degree of adjustment of the driving strength of the current path.

6. The decision feedback equalizer of claim 5, wherein the compensation circuit comprises:

a plurality of first transistors configured to receive the second output signal via gates thereof and coupled to the ground node; and a plurality of second transistors configured to receive the coefficient signal via gates thereof and respectively coupled in series to the plurality of first transistors.

7. The decision feedback equalizer of claim 1, wherein the first output signal comprises a positive first output signal and a negative first output signal, the first feedback comprises positive first feedback and negative first feedback, and wherein the compensation circuit is configured to adjust first driving strength of a first current path to the ground node from a first node, wherein the first node is configured to output the positive first output signal based on the positive first feedback, and adjust second driving strength of a second current path to the ground node from a second node, wherein the second is configured to output the negative first output signal based on the negative first feedback.

8. The decision feedback equalizer of claim 7, wherein the compensation circuit is further configured to control degrees of adjustment of the first and second driving strengths based on a coefficient signal.

9. A device, comprising:

a reception pad configured to receive a data signal comprising first data and second data, which are sequentially transferred via a channel; and a decision feedback equalizer configured to equalize the received data signal, wherein the decision feedback equalizer comprises:

a first input latch coupled to the reception pad and configured to generate a first output signal from the first data; and a second input latch coupled to the reception pad and configured to generate a second output signal from the second data, and wherein the second input latch comprises:

a first sub-circuit configured to generate internal signals having different transition timings according to a result of a comparison between the second data and a reference voltage; and a second sub-circuit configured to receive the first output signal as feedback and generate the second output signal by compensating for a difference between the transition timings of the internal signals based on the feedback, wherein the first and second output signals are return-to-zero signals, and the device further comprises: a middle latch circuit configured to receive the first and second output signals and convert the first and second output signals into non-return-to-zero signals; and an output latch circuit configured to output the converted first and second output signals in synchronization with a clock signal, wherein the second sub-circuit is further configured to;

receive a coefficient signal; and compensate for a difference between the transition timings of the internal signals, based on the coefficient signal.

10. The device of claim 9, wherein the second output signal comprises a positive second output signal and a negative second output signal, and the second sub-circuit is further configured to control, based on the coefficient signal, degrees of adjustment of driving strengths of a first current path to a ground node from a first node, which outputs the positive second output signal, and a second current path to the ground node from a second node, which outputs the negative second output signal, the first current path and the second current path being activated in response to the internal signals.

11. The device of claim 9, further comprising:

a controller configured to perform a training operation on the decision feedback equalizer to determine a value of the coefficient signal.

12. The device of claim 11, wherein the coefficient signal comprises a plurality of bit signals, and the controller is further configured to generate the value of the coefficient signal based on a result of the training operation.

13. The device of claim 12, wherein the second sub-circuit comprises a plurality of transistors configured such that a number of transistors turned on, from among the plurality of transistors, is determined in response to the plurality of bit signals to control a degree of adjustment of driving strength of a current path in the second sub-circuit.

14. The device of claim 11, wherein the controller is further configured to generate a digital signal based on a result of the training operation, and the device further comprises a digital-to-analog converter (DAC) configured to convert the digital signal, which is received from the controller, into the coefficient signal that is an analog signal.

15. The device of claim 14, wherein the second sub-circuit comprises a plurality of transistors configured such that resistance values of the plurality of transistors are determined in response to the coefficient signal to control a degree of adjustment of driving strength of a current path in the second sub-circuit.

16. The device of claim 9, wherein the first and second output signals are return-to-zero signals, and the device further comprises: a middle latch circuit configured to receive the first and second output signals and convert the first and second output signals into non-return-to-zero signals; and an output latch circuit configured to output the converted first and second output signals in synchronization with a clock signal.

17. A decision feedback equalizer, comprising:

an input latch circuit configured to output first and second output signals, which are return-to-zero signals, by respectively comparing odd data and even data with a reference voltage;

a middle latch circuit configured to receive the first and second output signals, convert the first and second output signals into non-return-to-zero signals, and output the converted first and second output signals; and an output latch circuit configured to receive the converted first and second output signals and output the converted first and second output signals in synchronization with a clock signal, wherein the input latch circuit comprises:

a first input latch comprising a first sub-circuit and a second sub-circuit, the first sub-circuit configured to generate first internal signals by comparing the odd data with the reference voltage, and the second sub-circuit configured to generate the first output signal based on the first internal signals and the second output signal; and a second input latch comprising a third sub-circuit and a fourth sub-circuit, the third sub-circuit configured to generate second internal signals by comparing the even data with the reference voltage, and the fourth sub-circuit configured to generate the second output signal based on the second internal signals and the first output signal.

* * * * *